(12) United States Patent
Shaw et al.

(10) Patent No.: US 10,542,487 B2
(45) Date of Patent: **\*Jan. 21, 2020**

(54) NETWORK EDGE BASED ACCESS NETWORK DISCOVERY AND SELECTION

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,733

(22) Filed: Apr. 3, 2018

(65) Prior Publication Data

US 2018/0227844 A1    Aug. 9, 2018

Related U.S. Application Data

(63) Continuation of application No. 15/480,341, filed on Apr. 5, 2017, now Pat. No. 9,961,625, which is a (Continued)

(51) Int. Cl.
*H04W 4/00* (2018.01)
*H04W 48/18* (2009.01)
(Continued)

(52) U.S. Cl.
CPC .......... *H04W 48/18* (2013.01); *H04W 12/06* (2013.01); *H04W 12/08* (2013.01); *H04W 8/18* (2013.01);
(Continued)

(58) Field of Classification Search
None
See application file for complete search history.

(56) References Cited

U.S. PATENT DOCUMENTS 4,334,221 A   6/1982   Rosenhagen et al.
4,829,565 A   5/1989   Goldberg
(Continued)

FOREIGN PATENT DOCUMENTS

EP   0167625 A1   1/1986
EP   0687626 A1   12/1995
(Continued)

OTHER PUBLICATIONS

Boddhu, et al. "A collaborative smartphone sensing platform for detecting and tracking hostile drones", Ground/Air Multisensor Interoperability, Integration, and Networking for Persistent ISR IV, Proc. of SPIE vol. 8742, 874211. May 22, 2013. 11 pages.
(Continued)

*Primary Examiner* — Clemence S Han
(74) *Attorney, Agent, or Firm* — Amin, Turocy & Watson, LLP

(57) ABSTRACT

An edge device comprising access network discovery and selection function (ANDSF) features is disclosed. An edge device can be a device located at a logical edge of a wireless network. An edge ANDSF component can rank access network resources. The rank can be based on characteristics of an access network resource, a user profile, device resource demands, or a user behavior model. The user profile can comprise information facilitating pre-authentication of a device to an access network resource. Further, the user profile can be considered portable with regard to localized aspects of edge ANDSF components. The user profile provides improved ANDSF feature performance.

20 Claims, 10 Drawing Sheets

Related U.S. Application Data continuation of application No. 14/549,119, filed on Nov. 20, 2014, now Pat. No. 9,629,076.

(51) Int. Cl.

| | |
|---|---|
| *H04W 12/08* | (2009.01) |
| *H04W 12/06* | (2009.01) |
| *H04W 48/14* | (2009.01) |
| *H04W 8/18* | (2009.01) |
| *H04W 84/04* | (2009.01) |
| *H04W 84/12* | (2009.01) |

(52) U.S. Cl.
CPC .......... *H04W 48/14* (2013.01); *H04W 84/045* (2013.01); *H04W 84/12* (2013.01)

(56) References Cited

U.S. PATENT DOCUMENTS

| | | | |
|---|---|---|---|
| 5,404,516 A | 4/1995 | Georgiades et al. | |
| 6,085,216 A | 7/2000 | Huberman et al. | |
| 6,819,982 B2 | 11/2004 | Doane | |
| 6,985,810 B2 | 1/2006 | Moitra et al. | |
| 7,117,067 B2 | 10/2006 | Mclurkin et al. | |
| 7,130,741 B2 | 10/2006 | Bodin et al. | |
| 7,149,611 B2 | 12/2006 | Beck et al. | |
| 7,236,858 B2 | 6/2007 | Carpenter et al. | |
| 7,252,265 B2 | 8/2007 | Perlo et al. | |
| 7,551,577 B2 | 6/2009 | Mcrae | |
| 7,583,632 B2 | 9/2009 | Janevski et al. | |
| 7,831,259 B2 | 11/2010 | Cao et al. | |
| 7,844,364 B2 | 11/2010 | Mclurkin et al. | |
| 8,045,980 B2 | 10/2011 | Buckley et al. | |
| 8,059,631 B2 | 11/2011 | Anto | |
| 8,060,270 B2 | 11/2011 | Vian et al. | |
| 8,160,606 B2 | 4/2012 | Shrivathsan et al. | |
| 8,213,458 B2 | 7/2012 | Norby | |
| 8,238,935 B2 | 8/2012 | Chen et al. | |
| 8,255,470 B2 | 8/2012 | Jackson et al. | |
| 8,260,485 B1 | 9/2012 | Meuth et al. | |
| 8,275,352 B2 | 9/2012 | Forstall et al. | |
| 8,315,800 B2 | 11/2012 | Sanchez et al. | |
| 8,369,867 B2 | 2/2013 | Van Os et al. | |
| 8,439,301 B1 | 5/2013 | Lussier et al. | |
| 8,442,005 B2 | 5/2013 | Dutta et al. | |
| 8,442,483 B2 | 5/2013 | Gunasekara | |
| 8,521,328 B2 | 8/2013 | Jang | |
| 8,559,925 B2 | 10/2013 | Zhang | |
| 8,565,176 B2 | 10/2013 | Norlen et al. | |
| 8,565,780 B2 | 10/2013 | Soelberg et al. | |
| 8,649,774 B1 | 2/2014 | Zheng et al. | |
| 8,665,089 B2 | 3/2014 | Saigh et al. | |
| 8,676,406 B2 | 3/2014 | Coffman et al. | |
| 8,768,555 B2 | 7/2014 | Duggan et al. | |
| 8,787,318 B2 | 7/2014 | Pampu et al. | |
| 8,788,121 B2 | 7/2014 | Klinger | |
| 8,799,476 B2 | 8/2014 | Karaoguz et al. | |
| 8,817,707 B2 | 8/2014 | Gupta | |
| 8,824,439 B2 | 9/2014 | Jiang et al. | |
| 8,827,206 B2 | 9/2014 | Van Speybroeck et al. | |
| 8,903,426 B2 | 12/2014 | Tholkes et al. | |
| 8,918,075 B2 | 12/2014 | Maier et al. | |
| 8,958,928 B2 | 2/2015 | Seydoux et al. | |
| 8,965,598 B2 | 2/2015 | Kruglick | |
| 9,258,761 B2 | 2/2016 | Bertrand et al. | |
| 9,524,648 B1 | 12/2016 | Gopalakrishnan et al. | |
| 9,629,076 B2* | 4/2017 | Shaw .................... | H04W 48/18 |
| 9,936,010 B1 | 4/2018 | Robbins et al. | |
| 9,961,625 B2* | 5/2018 | Shaw .................... | H04W 48/18 |
| 2002/0161862 A1 | 10/2002 | Horvitz | |
| 2004/0030571 A1 | 2/2004 | Solomon | |
| 2004/0073784 A1 | 4/2004 | Ishidoshiro | |
| 2005/0048918 A1 | 3/2005 | Frost et al. | |
| 2005/0105496 A1 | 5/2005 | Ambrosino | |
| 2006/0114324 A1 | 6/2006 | Farmer et al. | |
| 2007/0171818 A1 | 7/2007 | Shoji et al. | |
| 2007/0284474 A1 | 12/2007 | Olson et al. | |
| 2008/0135687 A1 | 6/2008 | Penzo | |
| 2008/0144884 A1 | 6/2008 | Habibi | |
| 2008/0194273 A1 | 8/2008 | Kansal et al. | |
| 2009/0086973 A1 | 4/2009 | Buddhikot et al. | |
| 2009/0156231 A1 | 6/2009 | Versteeg et al. | |
| 2009/0215469 A1 | 8/2009 | Fisher et al. | |
| 2009/0219393 A1 | 9/2009 | Vian et al. | |
| 2009/0248587 A1 | 10/2009 | Van Buskirk | |
| 2010/0024045 A1 | 1/2010 | Sastry et al. | |
| 2010/0240370 A1* | 9/2010 | Pandit .................. | H04W 36/385 455/436 |
| 2010/0250022 A1 | 9/2010 | Hines et al. | |
| 2011/0035284 A1 | 2/2011 | Moshfeghi | |
| 2011/0072101 A1 | 3/2011 | Forsell et al. | |
| 2011/0090870 A1 | 4/2011 | Ronneke et al. | |
| 2011/0176424 A1 | 7/2011 | Yang et al. | |
| 2011/0196912 A1 | 8/2011 | Payton et al. | |
| 2011/0301784 A1 | 12/2011 | Oakley et al. | |
| 2012/0004791 A1 | 1/2012 | Buelthoff et al. | |
| 2012/0029731 A1 | 2/2012 | Waldock et al. | |
| 2012/0058762 A1 | 3/2012 | Buckley et al. | |
| 2013/0034019 A1 | 2/2013 | Mustajarvi | |
| 2013/0039353 A1 | 2/2013 | Franco et al. | |
| 2013/0070641 A1 | 3/2013 | Meier et al. | |
| 2013/0077482 A1 | 3/2013 | Krishna et al. | |
| 2013/0107702 A1 | 5/2013 | Gupta et al. | |
| 2013/0128815 A1 | 5/2013 | Scherzer et al. | |
| 2013/0137423 A1 | 5/2013 | Das et al. | |
| 2013/0142056 A1 | 6/2013 | Abplanalp et al. | |
| 2013/0155849 A1 | 6/2013 | Koodli et al. | |
| 2013/0155851 A1 | 6/2013 | Koodli et al. | |
| 2013/0165120 A1 | 6/2013 | Nylander et al. | |
| 2013/0166103 A1 | 6/2013 | Ko | |
| 2013/0198397 A1 | 8/2013 | Zhang et al. | |
| 2013/0198817 A1 | 8/2013 | Haddad et al. | |
| 2013/0208693 A1 | 8/2013 | De La Forest Divonne et al. | |
| 2013/0210385 A1 | 8/2013 | Ahmed et al. | |
| 2013/0214925 A1 | 8/2013 | Weiss | |
| 2013/0225161 A1 | 8/2013 | Chhabra et al. | |
| 2013/0259020 A1 | 10/2013 | Ullah et al. | |
| 2013/0304257 A1 | 11/2013 | Wang et al. | |
| 2013/0308622 A1 | 11/2013 | Uhlik | |
| 2013/0333016 A1 | 12/2013 | Coughlin et al. | |
| 2013/0340013 A1 | 12/2013 | Chadha | |
| 2014/0004854 A1 | 1/2014 | Veran et al. | |
| 2014/0018976 A1 | 1/2014 | Goossen | |
| 2014/0023059 A1 | 1/2014 | Gupta | |
| 2014/0025233 A1 | 1/2014 | Levien et al. | |
| 2014/0032034 A1 | 1/2014 | Raptopoulos et al. | |
| 2014/0081479 A1 | 3/2014 | Vian et al. | |
| 2014/0092886 A1 | 4/2014 | Gupta | |
| 2014/0106743 A1 | 4/2014 | Ferraro Esparza et al. | |
| 2014/0126360 A1 | 5/2014 | Rong et al. | |
| 2014/0126532 A1 | 5/2014 | Bapat et al. | |
| 2014/0140575 A1 | 5/2014 | Wolf | |
| 2014/0187252 A1 | 7/2014 | Gupta et al. | |
| 2014/0192643 A1 | 7/2014 | Kalapatapu et al. | |
| 2014/0200749 A1 | 7/2014 | Spilsbury | |
| 2014/0206353 A1 | 7/2014 | Kim et al. | |
| 2014/0206439 A1 | 7/2014 | Bertrand et al. | |
| 2014/0241333 A1 | 8/2014 | Kim et al. | |
| 2014/0254434 A1 | 9/2014 | Jain et al. | |
| 2014/0254435 A1 | 9/2014 | Menendez et al. | |
| 2014/0254478 A1 | 9/2014 | Deshpande et al. | |
| 2014/0269654 A1 | 9/2014 | Canpolat et al. | |
| 2014/0312165 A1 | 10/2014 | Mkrtchyan | |
| 2014/0341076 A1 | 11/2014 | Orlandi et al. | |
| 2014/0378162 A1 | 12/2014 | Shatsky et al. | |
| 2015/0011241 A1 | 1/2015 | Papakipos et al. | |
| 2015/0017943 A1 | 1/2015 | Mitchell et al. | |
| 2015/0020147 A1 | 1/2015 | Krishnan et al. | |
| 2015/0065164 A1 | 3/2015 | Hoseinitabatabaei et al. | |
| 2015/0066248 A1 | 3/2015 | Arbeit et al. | |
| 2015/0101503 A1 | 4/2015 | Brown | |
| 2015/0120094 A1 | 4/2015 | Kimchi et al. | |
| 2015/0195759 A1 | 7/2015 | Sirotkin et al. | |
| 2015/0195858 A1 | 7/2015 | Jin et al. | |

(56) References Cited

U.S. PATENT DOCUMENTS

| | | |
|---|---|---|
| 2015/0223115 A1 | 8/2015 | Liang et al. |
| 2015/0236778 A1 | 8/2015 | Jalali |
| 2015/0264123 A1 | 9/2015 | Smadi et al. |
| 2015/0282058 A1 | 10/2015 | Forssell |
| 2015/0288797 A1 | 10/2015 | Vincent |
| 2015/0304885 A1 | 10/2015 | Jalali |
| 2015/0312808 A1 | 10/2015 | Kiss |
| 2015/0319102 A1 | 11/2015 | Esdaile et al. |
| 2015/0327067 A1 | 11/2015 | Shen et al. |
| 2015/0327136 A1 | 11/2015 | Kin et al. |
| 2015/0365351 A1 | 12/2015 | Suit |
| 2015/0373579 A1 | 12/2015 | Xu et al. |
| 2016/0035224 A1 | 2/2016 | Yang et al. |
| 2016/0035343 A1 | 2/2016 | Tang et al. |
| 2016/0050012 A1 | 2/2016 | Frolov et al. |
| 2016/0117355 A1 | 4/2016 | Krishnamurthy |
| 2016/0253710 A1 | 9/2016 | Publicover et al. |
| 2016/0293018 A1 | 10/2016 | Kim et al. |
| 2016/0307449 A1 | 10/2016 | Gordon et al. |
| 2017/0323235 A1 | 11/2017 | Johnston et al. |
| 2018/0074520 A1 | 3/2018 | Liu et al. |
| 2018/0206110 A1 | 7/2018 | Chaki et al. |

FOREIGN PATENT DOCUMENTS

| | | |
|---|---|---|
| EP | 2706790 A1 | 3/2014 |
| GB | 2231220 A | 11/1990 |
| GB | 2473825 A | 3/2011 |
| WO | 2010064548 A1 | 6/2010 |
| WO | 2013039573 A2 | 3/2013 |
| WO | 2013134669 | 9/2013 |
| WO | 2013163746 | 11/2013 |

OTHER PUBLICATIONS

Quaritsch, et al., "Collaborative Microdrones: Applications and Research Challenges", Autonomics 2008, Sep. 23-25, 2008, Turin, Italy. 7 pages.

Nova, et al., "The impacts of awareness tools on mutual modelling in a collaborative video-game", Groupware: Design, Implementation, and Use. vol. 2806 of the series Lecture Notes in Computer Science. Springer Berlin Heidelberg, 2003. 13 pages.

Choi, et al., "Collaborative Tracking Control of UAV-UGV", World Academy of Science, Engineering and Technology, International Scholarly and Scientific Research & Innovation, vol. 6, No. 11, 2012. 4 pages.

Zhao, Yilin. "Standardization of mobile phone positioning for 3G systems" IEEE Communications Magazine, Jul. 2002, 9 pages.

Paredes, et al. "SOSPhone: a mobile application for emergency calls", Universal Access in the Information Society Aug. 2014, vol. 13, Issue 3, 14 pages.

D'Roza, et al, "An Overview of Location-Based Services", BT Technology Journal, Jan. 2003, vol. 21, Issue 1, 8 pages.

Arminen, Ilkka. "Social functions of location in mobile telephony", Personal and Ubiquitous Computing, Aug. 2006, 5 pages.

Non-Final Office Action for U.S. Appl. No. 14/732,631 dated Apr. 28, 2016, 35 pages.

Office Action dated Aug. 4, 2016 for U.S. Appl. No. 14/530,593, 34 pages.

Office Action dated Sep. 21, 2016 for U.S. Appl. No. 14/732,631, 40 pages.

Morgenthaler, Simon, et al. "UAVNet: A mobile wireless mesh network using unmanned aerial vehicles." 2012 IEEE Globecom Workshops. IEEE, 2012. Retrieved on Aug. 26, 2016. 6 pages.

Di Felice, Marco, et al. "Self-organizing aerial mesh networks for emergency communication." 2014 IEEE 25th Annual International Symposium on Personal, Indoor, and Mobile Radio Communication (PIMRC). IEEE, 2014. Retrieved on Aug. 26, 2016. 6 pages.

Office Action dated Feb. 3, 2017 for U.S. Appl. No. 14/732,626, 125 pages.

Joseph, et al., "Interoperability of WiFi Hotspots and Cellular Networks", Proceedings of the 2nd ACM International Workshop on Wireless mobile applications and services in WLAN hotspots, Oct. 2004, 10 pages.

Li, et al., "Context-Aware Handoff on Smartphones", 2013 IEEE 10th International Conference on Mobile Ad-Hoc and Sensor Systems, Oct. 2013, 9 pages.

Tawil, et al., "Distributed Handoff Decision Scheme using MIH Function for the Fourth Generation Wireless Networks", 2008 3rd International Conference on Information and Communication Technologies: From Theory to Applications, Apr. 2008, 6 pages.

Taleb, et al., "On the Design of Energy-Aware 3G/WiFi Heterogeneous Networks under Realistic Conditions," 2013 27th International Conference on Advanced Information Networking and Applications Workshops, Mar. 2013, 5 pages.

Lee, et al, "Economics of WiFi offloading: Trading delay for cellular capacity", IEEE Transactions on Wireless Communications, vol. 13, No. 3, Mar. 2014, 15 pages.

Kotwal, et al. "Seamless Handoff between IEEE 802.11 and GPRS Networks", Distributed Computing and Internet Technology—Lecture Notes in Computer Science, Proceedings of the 6th International Conference, ICDCIT 2010, Feb. 2010, 7 pages.

Pyattaev, et al, "3GPP LTE traffic offloading onto WiFi Direct", IEEE Wireless Communications and Networking Conference Workshops, Apr. 2013, 6 pages.

Yang, et al, "A Performance Evaluation of Cellular/WLAN Integrated Networks," Fourth International Symposium on Parallel Architectures, Algorithms and Programming, Dec. 2011, 5 pages.

Bennis, et al, "When cellular meets WiFi in wireless small cell networks," IEEE Communications Magazine, Jun. 2013, vol. 51, Issue 6, 7 pages.

Melzer, et al, "Securing WLAN offload of cellular networks using subscriber residential access gateways," IEEE International Conference on Consumer Electronics, Jan. 2011, 2 pages.

Non-Final Office Action for U.S. Appl. No. 14/549,119, dated Jul. 14, 2016, 21 pages.

Office Action dated May 18, 2017 for U.S. Appl. No. 14/732,631, 51 pages.

Office Action dated Jun. 27, 2017 for U.S. Appl. No. 14/732,626, 15 pages.

Office Action dated Sep. 5, 2018 for U.S. Appl. No. 15/352,559, 60 pages.

Office Action dated Nov. 13, 2017 for U.S. Appl. No. 14/732,631, 51 pages.

Office Action dated Jan. 10, 2018 for U.S. Appl. No. 15/476,956, 35 pages.

Office Action dated Jan. 4, 2018 for U.S. Appl. No. 14/732,626, 28 pages.

Baxter, et al., "Scheduling UAV Surveillance Tasks, Lessons Learnt from Trials with Users," IEEE International Conference on Systems, Man, and Cybernetics, 2013. 5 pages.

Office Action dated Aug. 8, 2017 for U.S. Appl. No. 15/480,341, 39 pages.

Notice of Allowance dated Jun. 14, 2018 for U.S. Appl. No. 14/732,631, 38 pages.

Final Office Action dated Feb. 25, 2019 for U.S. Appl. No. 15/352,559, 30 pgs.

Notice of Allowance dated Jun. 21, 2019 for U.S. Appl. No. 15/352,559, 21 pages.

\* cited by examiner

NETWORK EDGE BASED ACCESS NETWORK DISCOVERY AND SELECTION

CROSS REFERENCE TO RELATED APPLICATION

This application is a continuation of, and claims priority to, U.S. patent application Ser. No. 15/480,341, filed on 5 Apr. 2017, and entitled "NETWORK EDGE BASED ACCESS NETWORK DISCOVERY AND SELECTION," now U.S. Pat. No. 9,961,625, which is a continuation of U.S. patent application Ser. No. 14/549,119, filed on 20 Nov. 2014, and entitled "NETWORK EDGE BASED ACCESS NETWORK DISCOVERY AND SELECTION," now U.S. Pat. No. 9,629,076, the entireties of which applications are hereby incorporated herein by reference.

TECHNICAL FIELD

The disclosed subject matter relates to access network discovery and selection, including network edge based access network discovery and selection.

BACKGROUND

By way of brief background, access network discovery and selection function (ANDSF) aids user equipment (UE) to discover non-cellular access networks. These access networks can include Wi-Fi, WiMax, etc. Conventional ANDSF technology can provide network selection rules and a list of access networks to a UE. This information can typically be provided by either a push or pull method, e.g., the information can be pushed to UEs without a request for the information, or can be pulled to the UE in response to a request by the UE. Numerous implementations of ANDSF functionality have been implemented. Typically, these implementations employ servers located in the core network of a cellular service provider, e.g., ANDSF functionality can be included in a home location register (HLR), etc. As such, push and pull of ANDSF information can experience a data throughput bottleneck wherein ANDSF data is accessed via a core network device. This bottleneck effect can result in delays, errors, and higher costs of operation. Further, system failures in ANDSF systems can result in broad disruption of ANDSF functionality for a large number of customers.

DETAILED DESCRIPTION

Figure 1:
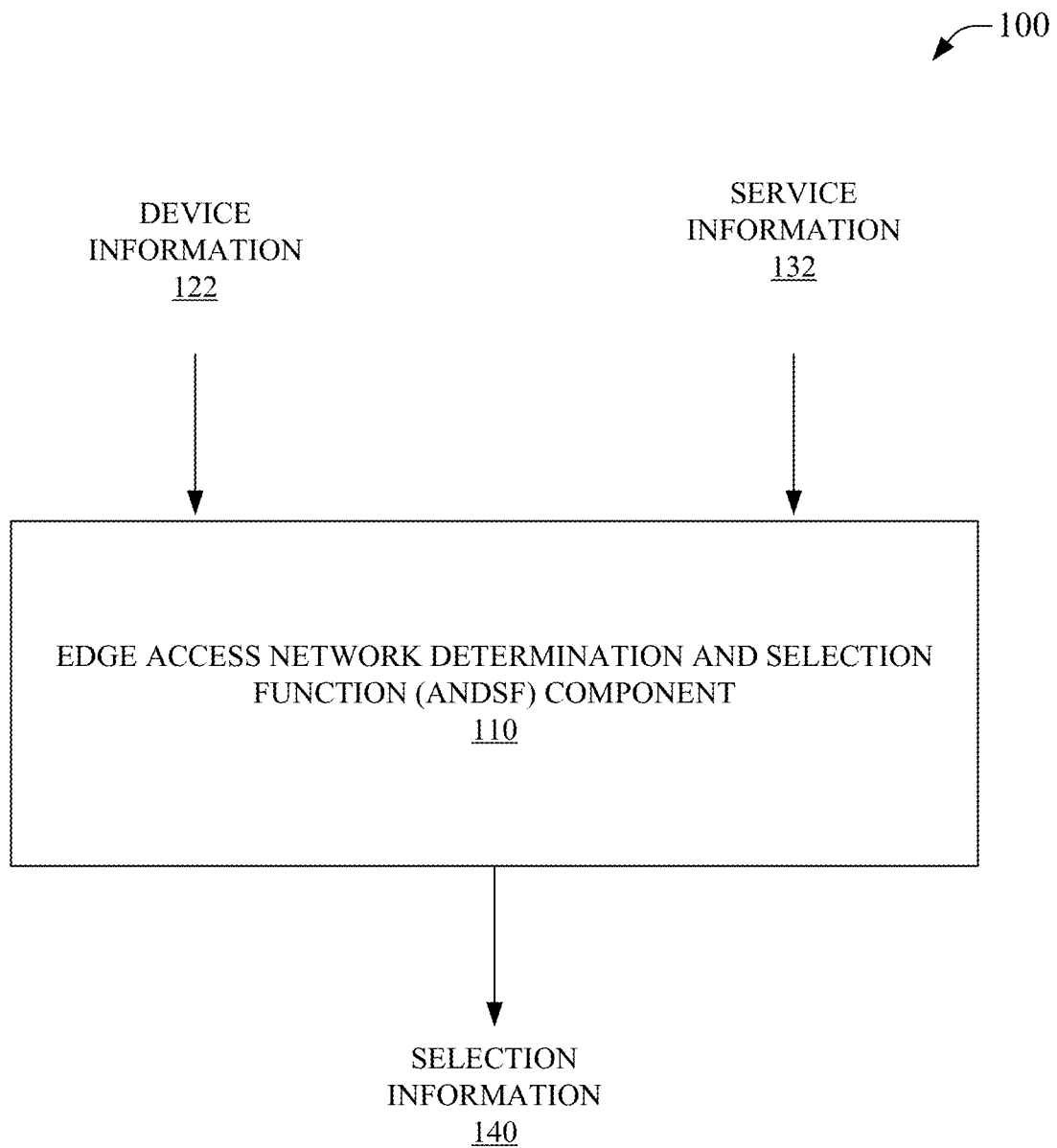
FIG. 1 is an illustration of a system that facilitates determining selection information via an ANDSF component located at an edge of a radio area network in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

An access network discovery and selection function (ANDSF) can aid user equipment (UE) to discover non-cellular access networks. These access networks can include Wi-Fi, WiMax, etc. Conventional ANDSF technology can push or pull network selection rules and a list of access networks to a UE. Typically, ANDSF implementations employ servers located in a core network of a cellular service provider, such as at an HLR, etc. Funneling ANDSF data access through a core network component of a service provider can result in a data bottleneck that can result in delay, error, and higher cost of operation. A system failure impacting a core network located ANDSF system can result in broad disruption of ANDSF functionality for a large number of customers.

In contrast to conventional ANDSF technology, edge based ANDSF, as disclosed, can allow for more robust, lower cost, and increased functionality related to ANDSF technology. Certain embodiments of the present disclosure provides for ANDSF type functionality to be located at an edge device, e.g., a device located at an edge of a radio access network (RAN), such as a NodeB, etc. An edge ANDSF component can experience a lower data throughput because ANDSF information accessed at an edge ANDSF component can be limited to UEs located near to the edge ANDSF component rather than UEs from large swaths of a network of a service provider all being funneled into an ANDSF component located in the service provider's core network. As an example, where a NodeB can interact with just a few hundred UEs, ANDSF information for these UEs can be accessed via an edge ANDSF component at a much lower data throughput than for a conventional core network located ANDSF component that can be servicing ANDSF information for hundreds of thousands to millions of UEs. Moreover, the lower data throughput can allow for use of alternative processors, memories, cabling, etc., that can be lower cost, older and more well understood, more readily available, easier to implement, etc., in an edge ANDSF component as compared to a conventional core network located ANDSF component.

The advantages of an edge ANDSF component can improve where the edge ANDSF component is not simply a mirror of a core network ANDSF component pushed to an edge component. While simply copying a core ANDSF component and placing at an edge device can be functional, it is likely highly inefficient in that duplicating ANDSF information for the network, as would be done in a core network ANDSF component, is duplicative where it is simply copied into numerous edge devices comprising a copy of a core network ANDSF component. An edge ANDSF component can facilitate access to localized ANDSF information. In an aspect, the sum of the localized ANDSF information from edge ANDSF components can comprise ANDSF information that would exist in a conventional core network ANDSF system. However, the sum of the localized ANDSF information is likely to also contain some redundant ANDSF information which can be beneficial where failures of individual edge ANDSF components can occur. In some embodiments, a hybrid edge ANDSF component and conventional core ANDSF component system can be employed providing redundant data between the edge and core ANDSF components. This can be part of a failover response allowing the edge ANDSF components to provide data when the core ANDSF component is down and, conversely, the core ANDSF component to provide data when one or more edge ANDSF components fail.

ANDSF information accessed by an edge ANDSF component can be constrained to correspond to local UEs or UEs predicted to become local. As such, there can be substantially lower memory requirements for this local ANDSF information. However, given the relatively low cost of memory, it can be beneficial to store supplementary information in a local ANDSF information set that, in conventional core network located ANDSF components, can be undesirable to store. This additional data can include UE device information, encryption keys, user preference information, historical service information, behavior models, favored network resource information, or nearly any other type of information. Furthermore, this supplementary information can provide for increased ANDSF related functionality, such as pre-authentication of UEs to next access points, improved resource selection based on behavior models, improved resource management, etc.

In an embodiment, a UE can comprise a device locker component (DLC) that can facilitate management of information, including supplementary information, which can be employed by an edge ANDSF component to improve the operation of the edge ANDSF component. A device locker component can comprise a locker profile associated with a user profile for a UE. The locker profile can comprise an identifier that can facilitate determination of relevant ANDSF information. The locker profile can further comprise location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. Further, the locker profile can comprise historical information for any of the aforementioned information. The information comprising the locker profile is not limited by this disclosure, and these examples are provided to illustrate that nearly any type of information can be included in the locker profile. In certain embodiments, the DLC can be located outside the UE, such as in an edge ANDSF component, on a cloud device, on another UE, etc. The locker profile information can be employed to improve ANDSF information selection, for example, conventional ANDSF information can be based on a location of a UE, in contrast, ANDSF information employing a locker profile can be based on a predicted location, a favored resource, and an anticipated user behavior determined from a behavior model, to allow pre-authentication of the UE with a ranked access network resource (ANR) in the predicted location allowing the UE to transition to the new resource efficiently. Moreover, the ranking of the ranked ANR in the instant example can be based on the anticipated behavior to allow selection or provisioning of resources by, for example, a network provider, in an efficient manner. This is in contrast to the conventional ANDSF component of the instant example simply offloading a cellular event onto a local Wi-Fi resource.

Further, the use of a DLC can facilitate forward population of ANDSF information to other edge ANDSF components. Recalling that an edge ANDSF component can, in an aspect, comprise ANDSF information for local UEs or anticipated UEs, it will be appreciated that sharing of ANDSF information with other edge ANDSF components can be effective to reduce holes in ANDSF coverage for a UE that moves though a radio environment. In an aspect, neighboring, or nearly neighboring, edge ANDSF components can share ANDSF information such that edge devices comprising an edge ANDSF component have relevant information to enable ANDSF information for a UE. This can allow a UE to move in any direction with a level of confidence that the next edge device will have an edge ANDSF component with ANDSF information for the UE. However, this can be less efficient that determining likely edge device transitions for the UE and selectively forwarding ANDSF information. As an example, where a UE is associated with movement along a train line between a home and work location on a regular basis, it can be less efficient to forward ANDSF information to edge devices that are substantially perpendicular to the train line. In the example, it can be more efficient to transfer ANDSF information to edge devices that are parallel to the train line inasmuch as an inference can be made that the UE will follow the train line based on historical information. Embodiments of the currently disclosed subject matter can employ simple forward population of ANDSF information or can employ more advanced forward population of ANDSF information, such as illustrated herein.

Edge ANDSF component can comprise a ranking component or sorting component that can operate on a set of ANRs. Sorting or ranking of resources can be beneficial to a network provider by placing an ANR in a position that satisfies the needs of a UE with less waste. As an example, where three ANRs, having a 128 kbs, a 512 kbs, and a 5 mbps channel correspondingly available to a UE that is streaming music at 256 kbs, the ANRs can be ranked 512 kbps, 5 mbps, 128 kbps. This can indicate that use of the 512 kbps is preferable so as not to tie up the 5 mbps channel in an underutilized manner, and so as to try to avoid the 128 kbps channel which could cause the UE to change streaming rates to continue to stream music over the lower rate channel. In an aspect, the sorting or ranking can also employ DLC information. As an example, the DLC information can comprise a user preference for channels with rates of 256 kbps or lower for music streaming processes, which information can be employed in ranking the three ANRs of the prior example as 128 kbps, 512 kbps, 5 mbps, to conform with the example user preference and example carrier efficiency goals.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates determining selection information via an ANDSF component located at an edge of a radio area network in accordance with aspects of the subject disclosure. System 100 can include edge ANDSF component 110 that can facilitate determining selection information 140. Edge ANDSF component 110 can receive device information 122. Device information 122 can comprise information related to a UE, a user or user profile associated with the UE, information about processes of the UE, or other information related to the UE. Edge ANDSF component 110 can receive service information 132. Service information 132 can comprise information related to an access network resource, information related to a wireless service provider or service provided thereby, account information related to an a UE, etc.

Edge ANDSF component 110 can be part of an edge device of a wireless network associated with a wireless service provider, e.g., a device located at an edge of a radio access network (RAN), as compared to a core component of the wireless network. As a non-limiting example, the edge device can be a NodeB and can comprise edge ANDSF component 110. As another non-limiting example, the edge device can be a femtocell or other similar device and can comprise edge ANDSF component 110. In contrast to conventional ANDSF technology typically having ANDSF functionality associated with a core network device, edge based ANDSF can provide more robust, lower cost, and increased ANDSF functionality. In an embodiment an edge ANDSF component 110 can experience a lower data throughput than a conventional ANDSF component because ANDSF information accessed at edge ANDSF component 110 can be associated with UEs located near to edge ANDSF component 110 rather than UEs from the breadth of a network being funneled into an ANDSF component located in a core network. As an example, ANDSF information at edge ANDSF component 110 can be associated with hundreds of UEs rather than the millions of UEs that might be associated with a conventional core network ANDSF component. This can allow for use of alternative processors, memories, cabling, etc., that can be lower cost, older and more well understood, more readily available, easier to implement, etc., as compared to the constituent parts of a conventional core network ANDSF component.

Further, edge ANDSF component 110 can facilitate access to localized ANDSF information. In an aspect, the sum of the localized ANDSF information from edge ANDSF components can be comparable to ANDSF information that would exist in a conventional core network ANDSF system, however, the sum of the localized ANDSF information is likely to also contain some redundant ANDSF information. This redundant information can be beneficial where failures of an individual edge ANDSF component can occur because some of the ANDSF information is likely to be present on other nearby edge ANDSF components of other edge devices.

Edge ANDSF component 110 can access ANDSF information generally corresponding to local UEs, e.g., UEs near an edge device such as a NodeB. Further, edge ANDSF component 110 can access ANDSF information for UEs predicted to enter the service area of an edge device based on inferences about their future position. These inferences can be based on historical information related to the UE or a user of a UE. As an example, where John regularly uses a tablet computer at home on weekends, an inference can be determined that propagates ANDSF for the tablet to a NodeB serving John's home. Further, if John gets a new tablet, the inference can extend to propagating ANDSF information for the new tablet to the NodeB near John's home. Edge ANDSF component 110 can be associated with substantially lower memory requirements to store local ANDSF information in contrast to core network ANDSF components that can house ANDSF information for an entire network. Edge ANDSF component 110 can also store supplementary information that can include UE device information, encryption keys, user preference information, historical service information, behavior models, favored network resource information, or nearly any other type of information. Furthermore, this supplementary information can provide for increased ANDSF related functionality, such as pre-authentication of UEs to predicted next access points, improved resource selection based on behavior models, improved resource management, etc.

In some embodiments, edge ANDSF component 110 can receive ANDSF information and/or supplementary information as part of device information 122 and/or service information 132. A UE can be a source of device information 122, such that, the UE acts to carry ANDSF information or supplementary information between edge ANDSF component 110 and a next edge ANDSF component. In some embodiments, a UE can facilitate access to supplementary information as part of device information 122, while ANDSF information is shared between edge devices as part of service information 132. As an example, edge ANDSF component 110 can be provided with service information 132 comprising ANDSF information related to a device predicted to enter the service area of the edge device comprising edge ANDSF component 110. Further, when the example device enters the service area of the edge device, supplemental information can be communicated to edge ANDSF component 110 from the device as part of device information 122. Based on device information 122 and service information 132, edge ANDSF component 110 can determine selection information 140. Selection information 140 can comprise information related to employing another communication link other than that provided by the edge device. As an example, selection information 140 can indicate that a wireless link be established between a UE and a Wi-Fi access point. As a further example, selection information 140 can indicate that a wireless link be maintained between a UE and the edge device.

Selection information 140 can comprise a set of access network resources. The set can be ordered, filtered, sorted, etc., and reflect suggested ANRs in accord with ANDSF functionality. Selection information 140 can be based on service information 132, which can comprise current or historical service information, such as, cellular network congestion, available ANRs, billing agreements for ANRs of other providers, carrier-centric selection rules, ANDSF information from core network components, etc. Selection information 140 can also be based on device information 122, which can comprise an identifier, location information, motion information, time information, predicted location information, schedule information, an encryption key, financial information, billing information, information related to a process in execution on the UE, QoE or QoS information, service tier information, user preferences, security information, privacy information, device hardware information, device software information, a behavior model, access network resource information, etc. As an example, selection information 140 can identify a local femtocell based on service information 132 comprising information indicating cellular network congestion, availability of the femtocell at the device location, available femtocell resources, and a range of service for the femtocell, and device information 122 comprising information indicating that the device has a key allowing access via the femtocell, the level of service of the device is acceptable in view of the available femtocell resources, and the motion data for the UE indicating a low likelihood of moving out of range of the femtocell.

Figure 2:
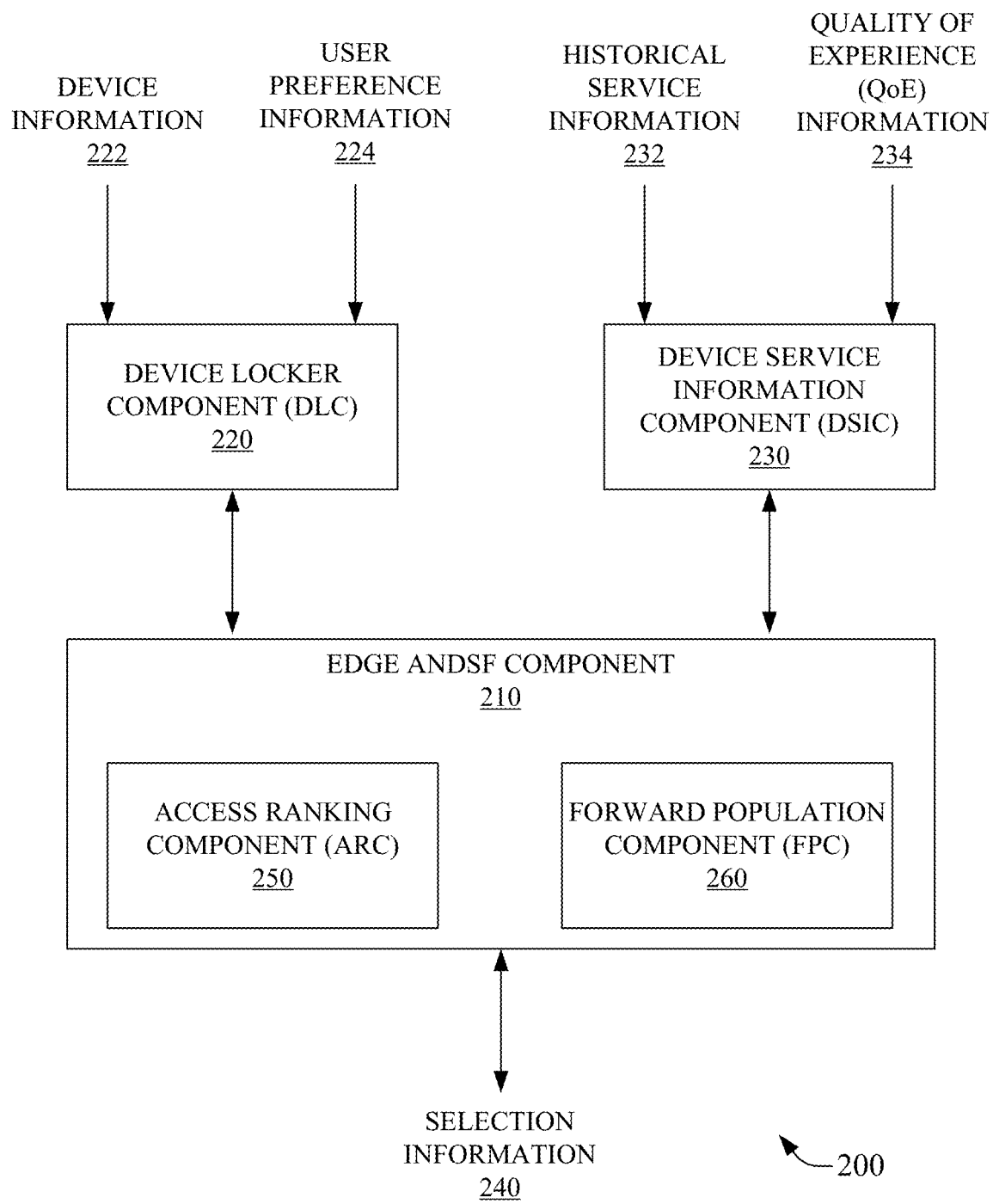
FIG. 2 is a depiction of a system that facilitates determining selection information, forward population of ANDSF information, and ranking of access network resources, via an edge ANDSF component in accordance with aspects of the subject disclosure.

FIG. 2 is a depiction of a system 200 that can facilitate determining selection information, forward population of ANDSF information, and ranking of access network resources, via an edge ANDSF component in accordance with aspects of the subject disclosure. System 200 can include edge ANDSF component 210 that can facilitate determining selection information 240. Edge ANDSF component 210 can be part of an edge device of a wireless network associated with a wireless service provider, e.g., a device located at an edge of a RAN such as a NodeB, a femtocell or other similar device, etc. Edge ANDSF component 210 can access ANDSF information associated with UEs located near to edge ANDSF component 210. In comparison to conventional core network ANDSF components, this can allow for use of alternative processors, memories, cabling, etc., that can be lower cost, older and more well understood, more readily available, easier to implement, etc. Whereas edge ANDSF component 210 can facilitate access to local ANDSF information, edge ANDSF component 210 can be associated with substantially lower memory requirements to store local ANDSF information in contrast to core network ANDSF components. Edge ANDSF component 210 can also store supplementary information that can include UE device information, encryption keys, user preference information, historical service information, behavior models, favored network resource information, or nearly any other type of information. Furthermore, this supplementary information can provide for increased ANDSF related functionality, such as pre-authentication of UEs to predicted next access points, improved resource selection based on behavior models, improved resource management, etc.

Edge ANDSF component 210 can be coupled to device locker component (DLC) 220. DLC 220 can comprise a locker profile associated with a user profile for a UE. The locker profile can comprise an identifier that can facilitate determination of relevant ANDSF information. DLC 220 can receive device information 222. Device information 222 can comprise information related to a UE, a user or user profile associated with the UE, information about processes of the UE, or other information related to the UE. DLC 220 can also user preference information 224. User preference information 224 can comprise information related to user preferences. User preferences can be related to ANRs. In some embodiments, user preference information can be related to preferred use of a UE which can correspond to determining an appropriate ANR, for example, where a user preference indicates a ceiling rate for certain applications executing on a UE, this preference can be related to selecting an ANR determined to satisfy a rule relating to the ceiling rate. The locker profile can also comprise location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. Further, the locker profile can comprise historical information for any of the aforementioned information.

The locker profile information can be employed to improve ANDSF information selection, for example, conventional ANDSF information can be based on a location of a UE, in contrast, ANDSF information employing a locker profile can be based on a predicted location, a preferred resource, an anticipated user behavior determined from a behavior model, etc., to allow pre-authentication of the UE to a selected ANR determined to satisfy parameters associated with the locker profile. Ranking of the ANR in the instant example can be based on the anticipated user behavior, the predicted location, and in consideration of the preferred resource.

Edge ANDSF component 210 can be coupled to device service information component (DSIC) 230. DSIC 230 can analyze historical service information 232 and QoE information 234 to determine information related to providing service to a device, such as, information related to an access network resource, information related to a wireless service provider or service provided thereby, account information related to an a UE, etc. DSIC 230 can also facilitate access to ANDSF rules or updates to ANDSF rules for selection of an ANR. As an example, edge ANDSF component 210, via DSIC 230, can be provided with information comprising ANDSF information, such as network congestion information, available ANR information, encryption information, an updated ANR selection rule, etc., related to a service area of an edge device comprising edge ANDSF component 210.

Edge ANDSF component 210 can comprise access ranking component (ARC) 250 which can facilitate ranking ANRs in accord with information received from DLC 220 and DSIC 230. Edge ANDSF component 210 can determine a preferred order of use for ANRs that can be available in the area of a UE. Selection information 240 can comprise this ranked ANR information. Where an ANR is available and ranked higher than other ANRs, this ANR can be selected by a UE based on selection information 240 received by the UE. Moreover, where the highest ranked ANR is not available, e.g., the UE is not in the service area of the ANR, the ANR no longer exists in the area, etc., then the UE can iteratively select the next lower ranked ANR to establish a link with.

ARC 250 ranking can be based on information received from DLC 220 and DSIC 230, such as, a ranking rule or update thereto, cellular network congestion, known ANRs, available ANRs, a historical ANR service area, billing agreements for ANRs of other providers, carrier-centric selection rules, ANDSF information from core network components, an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. Selection information 240 can comprise this ranked ANR information.

Edge ANDSF component 210 can comprise forward population component (FPC) 260 which can facilitate forward population of ANDSF information from edge ANDSF component 210 to other edge ANDSF components. Wherein an edge ANDSF component can, in an aspect, comprise ANDSF information for local UEs or anticipated UEs, this ANDSF information can be made available to other edge ANDSF components to reduce holes in ANDSF coverage for a wireless network. In an embodiment, neighboring, or nearly neighboring, edge ANDSF components can share ANDSF information. As such, a first edge device comprising a first edge ANDSF component can share information with a second edge device comprising a second edge ANDSF component to facilitate ANDSF functionality at the second edge device. This can allow a UE to move in any direction with a level of confidence that the next edge device will have an edge ANDSF component with ANDSF information relevant to the UE. In other embodiments, determining probabilities related to edge device transitions for a UE and selectively forwarding ANDSF information to high probability edge devices can provide for directed sharing of ANDSF information which can reduce propagation of redundant ANDSF information. As an example, where a UE is associated with a home on a river, ANDSF information can be forward populated to edge devices that are on the same side of the river rather than edge devices on the other side of the river based on a probability that the UE will not cross the river and access ANDSF information from edge devices on the other side of the river.

Figure 3:
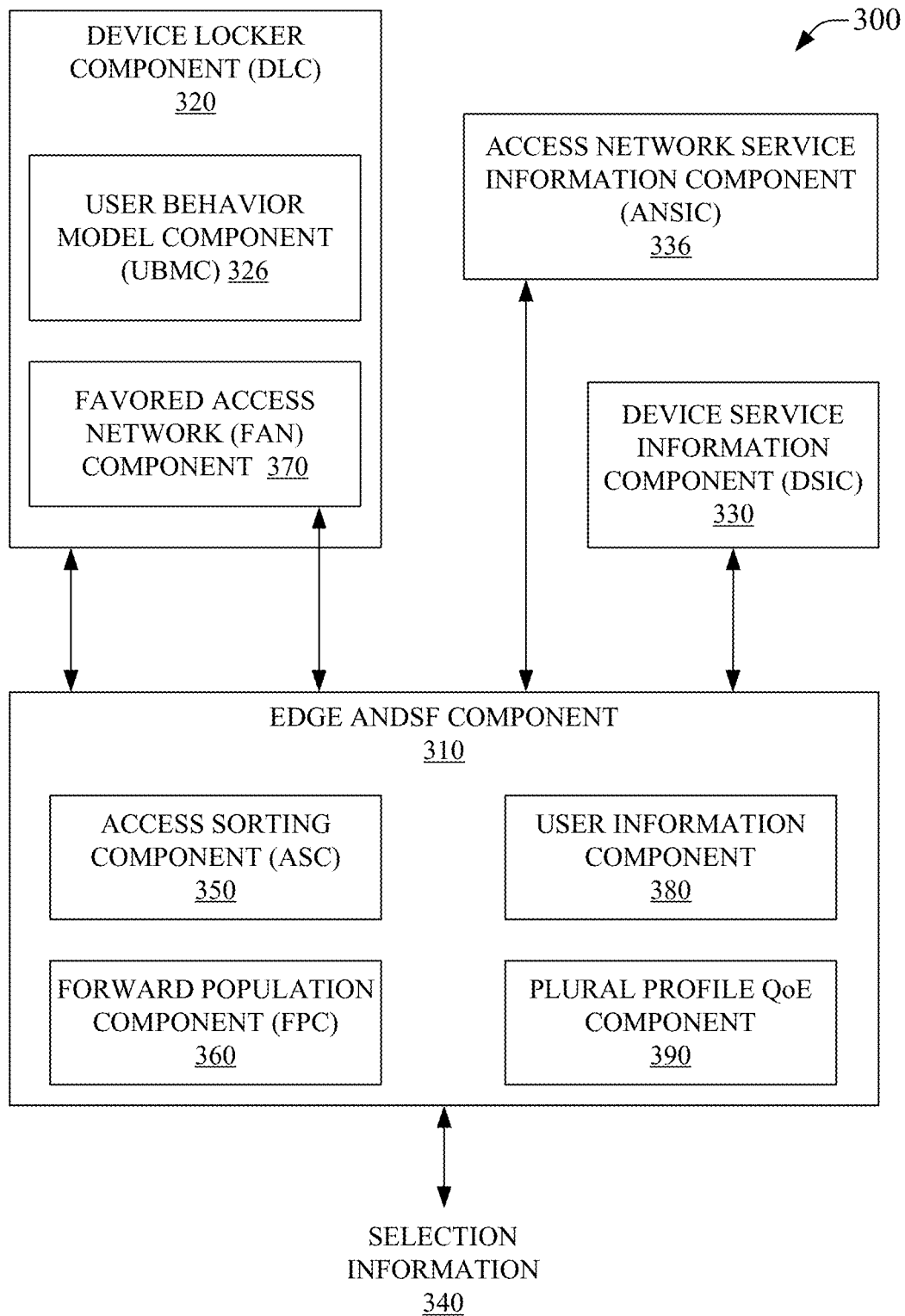
FIG. 3 illustrates a system that facilitates determining selection information via an edge ANDSF component based on a behavior model in accordance with aspects of the subject disclosure.

FIG. 3 illustrates a system 300 that facilitates determining selection information via an edge ANDSF component based on a behavior model in accordance with aspects of the subject disclosure. System 300 can include edge ANDSF component 310 that can facilitate determining selection information 340. Edge ANDSF component 310 can be part of an edge device of a wireless network associated with a wireless service provider, e.g., a device located at an edge of a RAN such as a NodeB, a femtocell or other similar device, etc. Edge ANDSF component 310 can access ANDSF information associated with UEs located near to edge ANDSF component 310. In comparison to conventional core network ANDSF components, this can allow for use of alternative processors, memories, cabling, etc., that can be lower cost, older and more well understood, more readily available, easier to implement, etc. Edge ANDSF component 310 can access supplementary information that can include UE device information, encryption keys, user preference information, historical service information, behavior models, favored network resource information, or nearly any other type of information. Furthermore, this supplementary information can provide for increased ANDSF related functionality, such as pre-authentication of UEs to predicted next access points, improved resource selection based on behavior models, improved resource management, etc.

Edge ANDSF component 310 can be coupled to device locker component (DLC) 320. DLC 320 can comprise a locker profile associated with a user profile. The locker profile can comprise an identifier that can facilitate determination of relevant ANDSF information. DLC 320 can receive device information related to a UE, a user or user profile associated with the UE, information about processes of the UE, or other information related to the UE. DLC 320 can also receive user preference information related to user preferences. User preferences can be related to ANRs. In some embodiments, user preference information can be related to preferred use of a UE which can correspond to determining an appropriate ANR, for example, where a user preference indicates a ceiling rate for certain applications executing on a UE, this preference can be related to selecting an ANR determined to satisfy a rule relating to the ceiling rate. The locker profile can also comprise location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. Further, the locker profile can comprise historical information for any of the aforementioned information.

DLC 320 can comprise user behavior model component (UBMC) 326 that can enable use of a user behavior model in ANR selection. A user behavior model can be adapted based on locker profile information. In an aspect, a user behavior model can reflect behavioral trends for a user with regard to a device or multiple devices. As an example, a user behavior model can reflect that a UE frequently downloads large files when in use by a user. As another example, a user behavior model can reflect that a user accesses a secure website on multiple devices in a certain repeating temporal window, such as, every Thursday between 9 am and noon. In an embodiment, a user behavior model can supplement locker profile information that can be employed to improve ANDSF information selection. Ranking of an ANR can be based on anticipated user behavior based on the user behavior model and/or the locker profile information. In some embodiments, a user behavior model can represent user behavior trends while locker profile information can convey more granular user information. In some embodiments, the user behavior model can be updated based on information received from edge ANDSF component 310. Further, UBMC 326 can be employed to share information with disparate edge ANDSF components 310, for example, where a UE boards a plane in California and disembarks the plane in Florida, UBMC 326 can source information to a Florida edge ANDSF component 310 even though the last network identified position of the UE was in California. This can facilitate populating edge ANDSF components in Florida directly without accessing information from a core network component of a wireless network provider. In an aspect, UBMC 326 can make DLC information portable, e.g., allowing a UE to jump into a new location and still have the benefits of DLC information for ANDSF via an edge device in the new location.

DLC 320 can comprise favored access network (FAN) component 370. FAN component 370 can determine a favored ANR. In an embodiment, FAN component 370 can store a plurality of favored ANRs. These can be ordered or ranked. In an aspect, a user can designate favored ANRs to facilitate the ranking or ordering. In another aspect, the ranking or ordering can be determined from historical linking to an ANR. In a further aspect, ranking or ordering of the ANRs can be affected by additional information related to use of an ANR or related to information about an ANR. As an example, an first ANR can be associated with access to a specific website such that when the website is accessed at a later date, the first ANR can have be associated with an elevated ranking. As another example, a user can designate that a second ANR has poor security protocols which can result in the second ANR having a decreased ranking.

Edge ANDSF component 310 can be coupled to device service information component (DSIC) 330. DSIC 330 can analyze historical service information, QoE information, etc., to determine information related to providing service to a device, such as, information related to a wireless service provider or service provided thereby, account information related to an a UE, etc. DSIC 330 can also facilitate access to ANDSF rules or updates to ANDSF rules for selection of an ANR. As an example, edge ANDSF component 310, via DSIC 330, can be provided with information comprising ANDSF information, such as network congestion information, available ANR information, encryption information, an updated ANR selection rule, etc., related to a service area of an edge device comprising edge ANDSF component 310.

Edge ANDSF component 310 can be coupled to access network service information component (ANSIC) 336. ANSIC 336 can determine information related to ANR services and performance. In an aspect, ANR services and performance information can comprise current or historical availability of an ANR, coverage areas of an ANR, QoS of an ANR, performance characteristics of an ANR, costs or fees associated with use of an ANR, service agreements with an ANR, etc. This information can affect determination of selection information by edge ANDSF component 310. As an example, where an ANR has high performance characteristics, is historically available, serves a location associated with a UE, and has a no cost agreement with a wireless carrier, this information can affect a position of the ANR in a sort of ANRs performed by edge ANDSF component 310 via access sorting component (ASC) 350, which in turn can affect selection of this ANR as relayed in selection information 340.

Edge ANDSF component 310 can comprise access sorting component (ASC) 350 which can facilitate sorting ANRs in accord with information received from DLC 320, DSIC 330, and ANSIC 336. In an embodiment, edge ANDSF component 310 can determine a preferred order of use for ANRs that can be available in the area of a UE. Selection information 340 can comprise this sorted ANR information. Where an ANR is available and earlier in a sorted set of ANRs, this ANR can be selected by a UE based on selection information 340 received by the UE. Moreover, where the earliest ANR of a sorted list of ANRs is not available then the UE can iteratively select a later listed ANR from the sorted ANR list with which to establish a link. ASC 350 sorting can be based on information received from DLC 320, DSIC 330, and ANSIC 336, such as, a ranking rule or update thereto, cellular network congestion, known ANRs, available ANRs, a historical ANR service area, billing agreements for ANRs of other providers, carrier-centric selection rules, ANDSF information from core network components, an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. Selection information 340 can comprise this sorted ANR information.

Edge ANDSF component 310 can comprise forward population component (FPC) 360 which can facilitate forward population of ANDSF information from edge ANDSF component 310 to other edge ANDSF components. Wherein an edge ANDSF component can, in an aspect, comprise ANDSF information for local UEs or anticipated UEs, this ANDSF information can be made available to other edge ANDSF components to reduce holes in ANDSF coverage for a wireless network. In an embodiment, neighboring, or nearly neighboring, edge ANDSF components can share ANDSF information. As such, a first edge device comprising a first edge ANDSF component can share information with a second edge device comprising a second edge ANDSF component to facilitate ANDSF functionality at the second edge device. This can allow a UE to move in any direction with a level of confidence that the next edge device will have an edge ANDSF component with ANDSF information relevant to the UE. In other embodiments, determining probabilities related to edge device transitions for a UE and selectively forwarding ANDSF information to high probability edge devices can provide for directed sharing of ANDSF information which can reduce propagation of redundant ANDSF information.

In an embodiment, edge ANDSF component 310 can comprise user information component 380. User information component 380 can facilitate access to information related to a user or use of a device. In some embodiments, user information component 380 can store information comprising DLC information, for example acting as a local copy of DLC information. It will be noted that user information component 380 can store more or less information than that associated with DLC 320, e.g., user information component 380 can store only a portion of DLC information, user information component 380 can store information in addition to DLC information, or user information component 380 can store some DLC information and some additional information other than DLC information. In an aspect, user information component 380 can store information for a plurality of users or devices.

In an embodiment, edge ANDSF component 310 can comprise plural profile QoE component 390. Plural profile QoE component 390 can determine the effects of ANDSF information made available to UEs. In a further aspect, plural profile QoE component 390 can infer changes to QoE based on providing selection information to a plurality of UEs. This inference can be employed by ASC 350 to adapt sorting to meet a determined objective. In an aspect, where multiple UEs interact with an edge device comprising edge ANDSF component 310, plural profile QoE component 390 can infer an effect on QoE experienced by each UE based on how resources are allocated, which UEs are offloaded to different permutations of ANRs, historical use, etc. As an example, offloading UEs to ANRs on a highest available bandwidth may cause the QoE metric to be less desirable than offloading UEs to ANRs by closest sufficient bandwidth based on historic UE bandwidth usage. In this example, where a UE historically uses little bandwidth, it can be inefficient to suggest, by way of selection information 340, that the UE link with an ANR having a large amount of bandwidth. This inefficiency can impact an overall QoE. Plural profile QoE component 390 can allow edge ANDSF component 310 to sort ANRs to meet QoE goals for multiple UEs. As an example, where three ANRs all have similarly low latency, plural profile QoE component 390 can indicate that offloading UEs for VoIP can occur in any order because all three ANRs are expected to provide a similar QoE. In contrast, where two ANR have low latency and one ANR has high latency, the first two UEs involved in VoIP can be directed to the low latency ANRs while the third UE remains on cellular service in order to maintain a high QoE value as compared to designating a high latency ANR to the third UE. Correspondingly, plural profile QoE component 390 information can be employed by ASC 350 to sort ANRs accordingly and selection information 340 for the first two UEs can designate the low latency ANRs while selection information 340 for the third UE indicates that the third ARC has a high latency in a manner so as to keep the third UE on a cellular connection rather than offloading to the third ANR.

Figure 4:
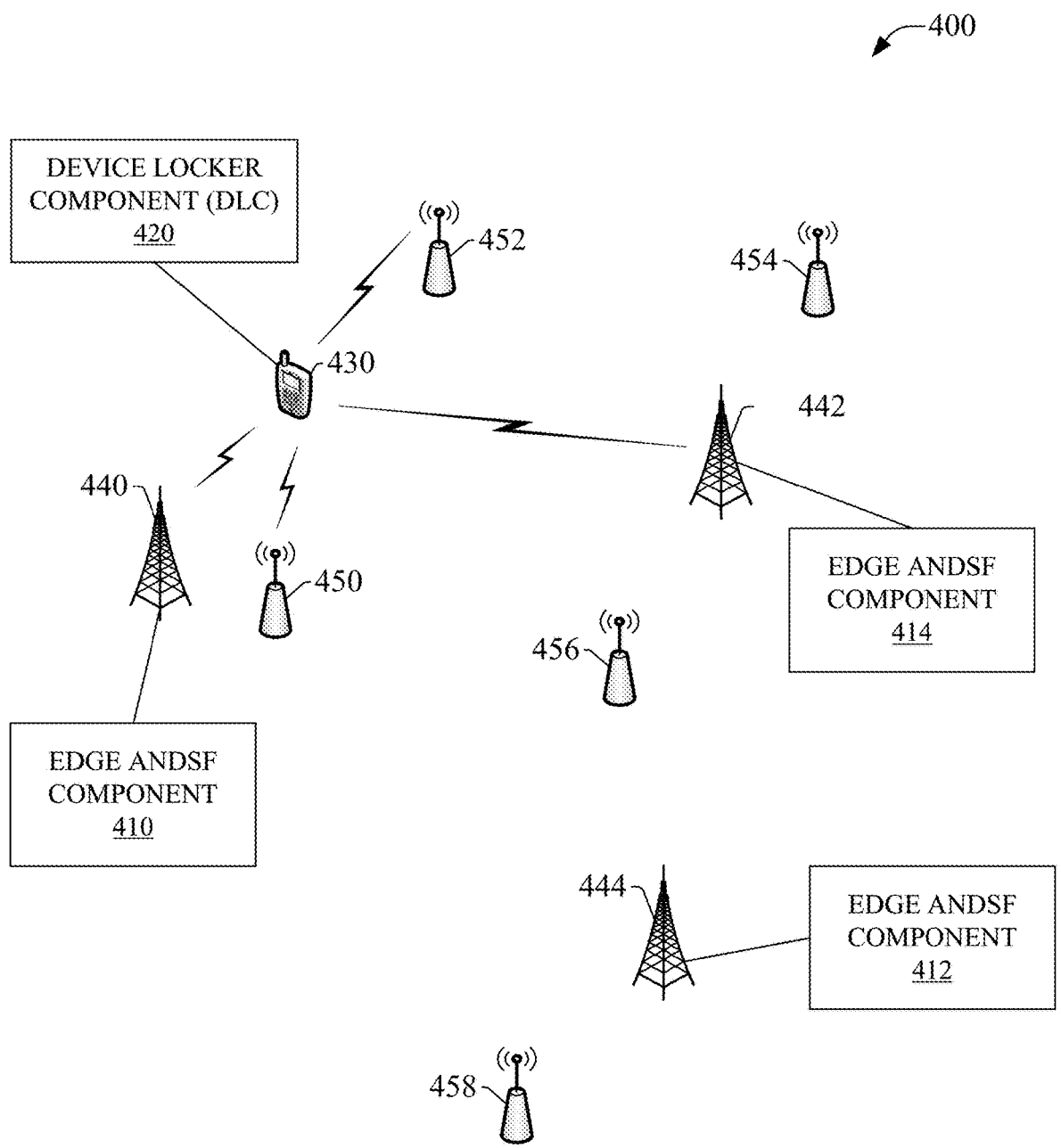
FIG. 4 illustrates an example system that facilitates ANDSF functionality via edge ANDSF components and a device locker component in accordance with aspects of the subject disclosure.

FIG. 4 illustrates example system 400 that facilitates ANDSF functionality via edge ANDSF components and a device locker component in accordance with aspects of the subject disclosure. System 400 can include edge ANDSF component 410 located at edge device 440 which can be linked to UE 430 that can comprise DLC 420. As such, DLC information can be employed by edge ANDSF component 410 to determine ANR selection information. ANR selection information with regard to edge device 440 can include information relating to ANR 450 and 452. DLC information from DLC 420 can be received by edge ANDSF component 410. As previously disclosed, DLC information can include a user behavior model associated with a user of UE 430. Further, DLC information can comprise locker profile information that can comprise location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. Edge ANDSF component 410 can further receive ANR information related to ANR 450 and 452 that can comprise current or historical availability of an ANR, coverage areas of an ANR, QoS of an ANR, performance characteristics of an ANR, costs or fees associated with use of an ANR, service agreements with an ANR, etc.

Edge ANDSF component 410 can determine selection information based on the DLC information and the ANR information. In an aspect, edge ANDSF component 410, as part of determining selection information, can rank ANR 450 and 452. This ranking can be based on the DLC information and ANR information. Further, the rank can reflect a predicted effect on QoE related to selecting an ANR, e.g., 450 or 452, in conjunction with other UEs (not illustrated) associated with edge device 440. The QoE prediction can aid in keeping overall satisfaction from multiple UEs high with regard to designating particular ANRs for a plurality of UEs in view of the historical and current use of said UEs.

System 400 further illustrates that edge device 442 can comprise edge ANDSF component 414. UE 430 can be determined to be moving towards edge device 442. Edge ANDSF component 410 can forward populate edge ANDSF component 414 with ANDSF information from edge ANDSF component 410. UE 430 can establish a link with edge device 442 where UE 430 is moving towards edge device 442. UE 430 can then share DLC information with edge ANDSF component 414. Edge device 442 can be local to ANR 454 and 456. Edge ANDSF component 414 can receive ANR information related to ANR 454 and 456 that can comprise current or historical availability of an ANR, coverage areas of an ANR, QoS of an ANR, performance characteristics of an ANR, costs or fees associated with use of an ANR, service agreements with an ANR, etc. As such, edge ANDSF component 414 can determine selection information based on the DLC information and ANR 454 and 456 information. As an example, where movement of UE 430 is towards ANR 456 rather than ANR 454, this motion information can result in ANR 456 having a higher ranking than ANR 454 where all other aspects are equivalent. Where UE 430 is offloaded from edge device 442, it can preferentially be to ANR 456 as indicated by corresponding selection information.

System 400 additionally illustrates that edge device 444 can comprise edge ANDSF component 412. UE 430 can be determined to be moving to an area between edge device 442 and 444. Edge ANDSF component 410 can forward populate edge ANDSF components 414 and 412 with ANDSF information from edge ANDSF component 410. UE 430 can establish a link with edge device 442 where UE 430 is moving towards an area between edge device 442 and 444. This information can be conveyed to edge ANDSF component 412. UE 430 can then share DLC information with edge ANDSF components 414 and 412. Edge device 442 can be local to ANR 454 and 456. Edge device 444 can be local to ANR 456 and 458. Edge ANDSF component 414 can receive ANR information related to ANR 454 and 456 that can comprise current or historical availability of an ANR, coverage areas of an ANR, QoS of an ANR, performance characteristics of an ANR, costs or fees associated with use of an ANR, service agreements with an ANR, etc. Similar information can be received by edge ANDSF component 412 with regard to ANR 456 and 458. As such, edge ANDSF component 414 can determine selection information based on the DLC information and ANR 454 and 456 information in view of ANR 456 and 458 with regard to edge ANDSF component 412. In an aspect, edge ANDSF components 412 and 414, as part of individually determining selection information, can rank ANR 454, 456 and 458. This ranking can be based on the DLC information and ANR information. Further, the rank can reflect a predicted effect on QoE related to selecting ANR 454, 456 or 458, in conjunction with other UEs (not illustrated) as serviced by either edge device 442 or edge device 444. The QoE prediction can aid in keeping overall satisfaction from multiple UEs high, with regard to designating particular ANRs for a plurality of UEs across a plurality of edge devices, in view of the historical and current use of said UEs.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
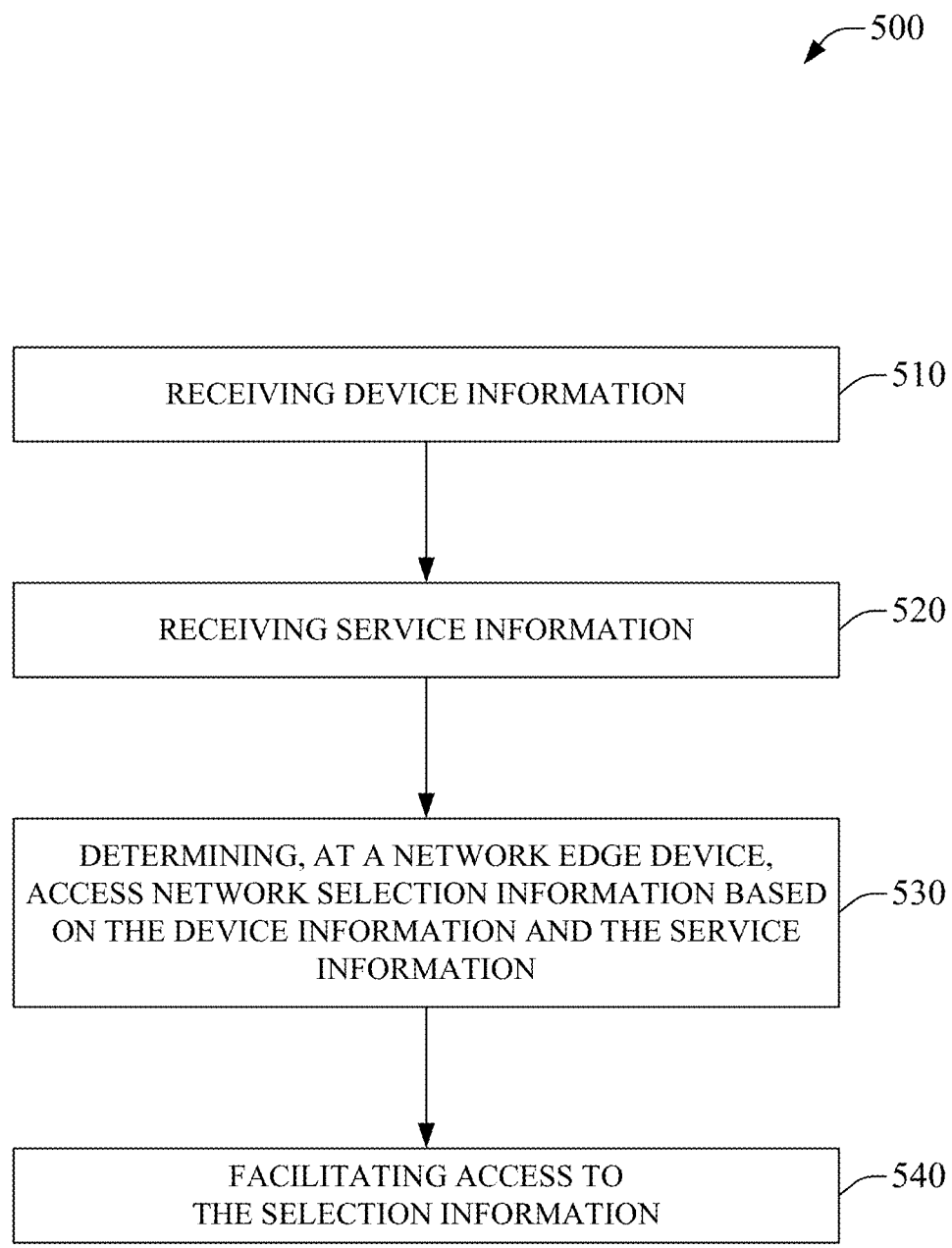
FIG. 5 illustrates a method that facilitates access to selection information via an ANDSF component located at a network edge device in accordance with aspects of the subject disclosure.

FIG. 5 illustrates a method 500 that facilitates access to selection information via an ANDSF component located at a network edge device in accordance with aspects of the subject disclosure. At 510, method 500 can include receiving device information. Device information can comprise information related to a UE, a user or user profile associated with the UE, information about processes of the UE, or other information related to the UE. In an embodiment, device information can further comprise UE identification information, encryption keys, user preference information, historical service information, behavior models, favored network resource information, etc. At 520, method 500 can comprise receiving service information. Service information can comprise information related to an access network resource, information related to a wireless service provider or service provided thereby, account information related to an a UE, etc.

At 530, method 500 can comprise determining, at a network edge device, access network selection information. A network edge device can be a device located at a logical edge of a wireless network associated with a wireless service provider, e.g., a device located at an edge of a radio access network (RAN), such as, a NodeB, a femtocell, a picocell, or other logical edge device. The determination of the access network selection information can be based on the device information from 510 and the service information from 520. In an aspect, determination of the access network selection information at an edge device can be related to determination of the access network selection information based on local access network resources (ANRs) and local UEs. In comparison to employing conventional core network ANDSF components, determining access network selection information based on local ANRs and local UEs can process less data and thereby beneficially allow for use of alternative processors, memories, cabling, etc., that can be lower cost, older and more well understood, more readily available, easier to implement, etc.

At 540, method 500 can comprise facilitating access to the selection information determined at 530. At this point method 500 can end. Selection information can comprise information facilitating the selection of an ANR with which a UE can form a communication link in the alternative to maintaining a link via a cellular network. Selection information can further comprise ANR identification information, ANR ranking information, ANR characteristic values, such as speeds, handshake information, bandwidth limits, etc., encryption keys, passwords, etc. Where a plurality of ANRs are included in the selection information, they can be ordered or ranked to facilitate selection of the ANR for linking with the UE in a preferential order, for example, a first ANR can be most favored, a second ANR can be less favored, and a third ANR can be least favored, with regard to linking with the UE. Ranking or ordering can be based on a ranking rule or update thereto, cellular network congestion, known ANRs, available ANRs, a historical ANR service area, billing agreements for ANRs of other providers, carrier-centric selection rules, ANDSF information from core network components, an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc., which information can be included in device information from 510 or service information form 520.

Figure 6:
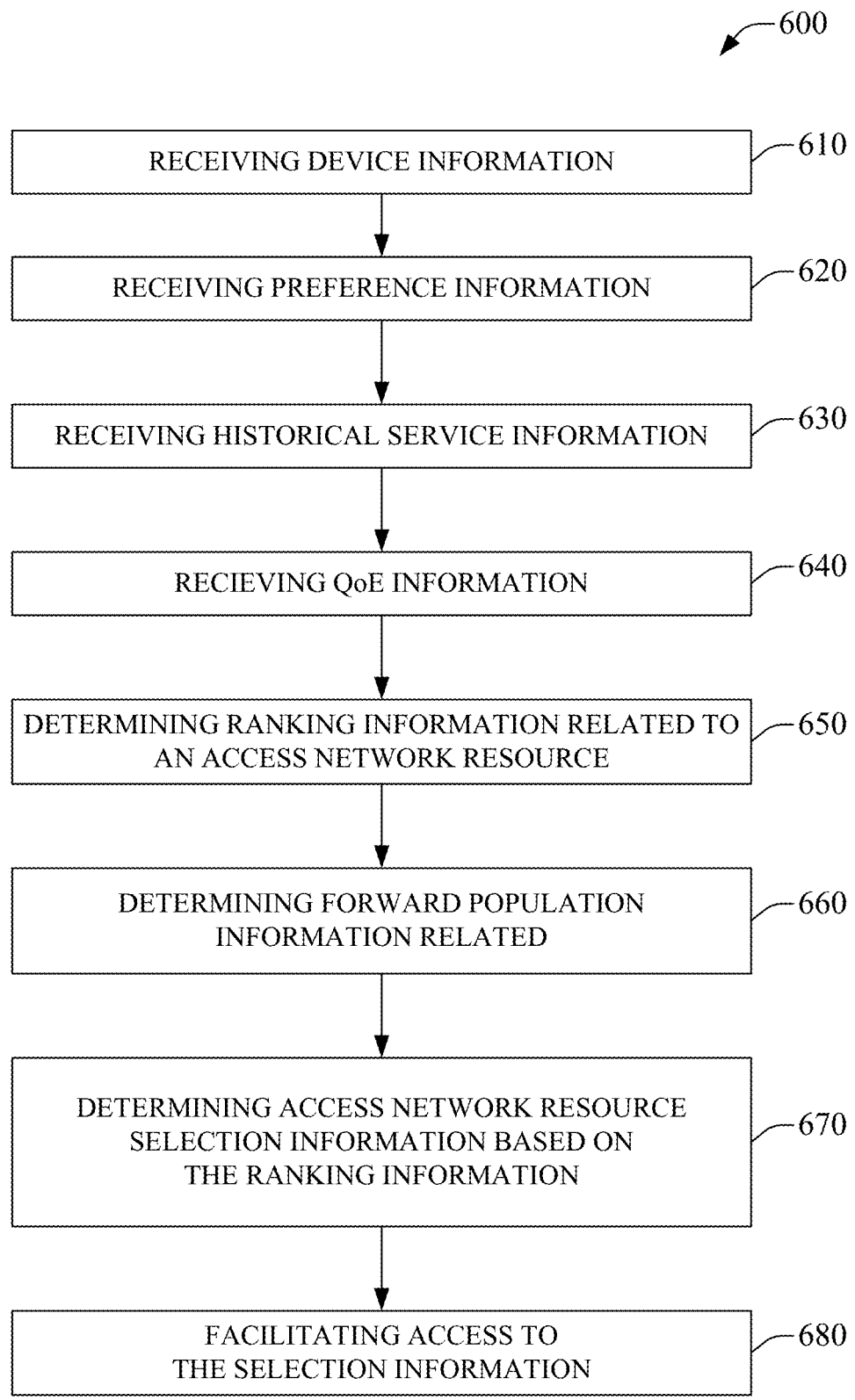
FIG. 6 illustrates a method that facilitates access to selection information via an ANDSF component based on ranking and forward population information in accordance with aspects of the subject disclosure.

FIG. 6 illustrates a method 600 that facilitates access to selection information via an ANDSF component based on ranking and forward population information in accordance with aspects of the subject disclosure. At 610, method 600 can include receiving device information. Device information can comprise information related to a UE, a user or user profile associated with the UE, information about processes of the UE, or other information related to the UE. In an embodiment, device information can further comprise UE identification information, encryption keys, historical service information, behavior models, etc. At 620, method 600 can include receiving preference information associated with a user profile that can include information related to ANR selection such as, encryption preferences, cost preferences, speed preferences, schedule preferences, network preferences, etc., favored ANR information, etc. At 630, method 600 can comprise receiving historical service information. Historical service information can comprise historical information related to an access network resource, historical information related to a wireless service provider or service provided thereby, historical account information related to an a UE, etc. At 640, method 600 can comprise receiving quality of experience (QoE) information which can comprise service analytics information, such as, dropped calls metrics, data rates, dropped packets, ping times, network congestion measurements, throughput, etc., user based service feedback, and other information relating to measuring a quality of the service experience related to ANDSF features.

At 650, method 600 can comprise determining, ranking information related to an ANR. An ANR can be ordered or ranked against other ANRs to facilitate selection of the ANR for linking with a UE in a preferential order. Ranking or ordering can be based on a ranking rule or update thereto, cellular network congestion, known ANRs, available ANRs, a historical ANR service area, billing agreements for ANRs of other providers, carrier-centric selection rules, ANDSF information from core network components, an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc., which information can be included in device information from 610 or historical service information form 620.

At 660, method 600 can include determining forward population information. An edge ANDSF component can, in an aspect, comprise ANDSF information for local UEs or anticipated UEs, and sharing of ANDSF information with other edge ANDSF components can be effective to reduce holes in ANDSF coverage for a UE in a wireless network employing edge ANDSF components. In an aspect, nearby edge ANDSF components can share ANDSF information such that edge devices comprising an edge ANDSF component have relevant information to enable ANDSF information for a UE. This can allow a UE to move in any direction with a level of confidence that the next edge device will have an edge ANDSF component with ANDSF information for the UE. In another aspect, determining probable edge device transitions for the UE can facilitate selectively forwarding ANDSF information. As an example, where a UE is associated with a specific zone, it can be unnecessary to forward ANDSF information to all edge devices that are near the zone but not in the zone. In the example, it can be more efficient to transfer ANDSF information specifically to edge devices that are only in the zone where an inference can be made that the UE will not leave the zone based on historical information. Determining forward population information can be related to simple forward population of ANDSF information determined to satisfy a rule related to a propagation depth, or can be related to more advanced forward population of ANDSF information that employs predictive analysis for determining which edge ANDSF components to populate.

At 670, method 600 can include determining access network selection information. The determination of the access network selection information can be based on the ranking information from 650, which can be based on device information from 610, preference information from 620, historical service information from 630, and QoE information from 640.

At 680, method 600 can comprise facilitating access to the selection information determined at 670. At this point method 600 can end. Selection information can comprise information facilitating the selection of a preferred ANR to link with a UE. Selection information can further comprise ANR identification information, ANR ranking information, ANR characteristic values, such as speeds, handshake information, bandwidth limits, etc., encryption keys, passwords, etc. Where a plurality of ANRs are included in the selection information, they can be ranked, ordered, or sorted.

In an aspect, method 600 can be performed at a network edge device. A network edge device can be a device located at a logical edge of a wireless network associated with a wireless service provider, e.g., a device located at an edge of a radio access network (RAN), such as, a NodeB, a femtocell, a picocell, or other logical edge device. In an aspect, determination of the access network selection information at an edge device can be related to determination of the access network selection information based on local access network resources (ANRs) and local UEs. In comparison to employing conventional core network ANDSF components, determining access network selection information based on local ANRs and local UEs can process less data and thereby beneficially allow for use of alternative processors, memories, cabling, etc., that can be lower cost, older and more well understood, more readily available, easier to implement, etc.

Figure 7:
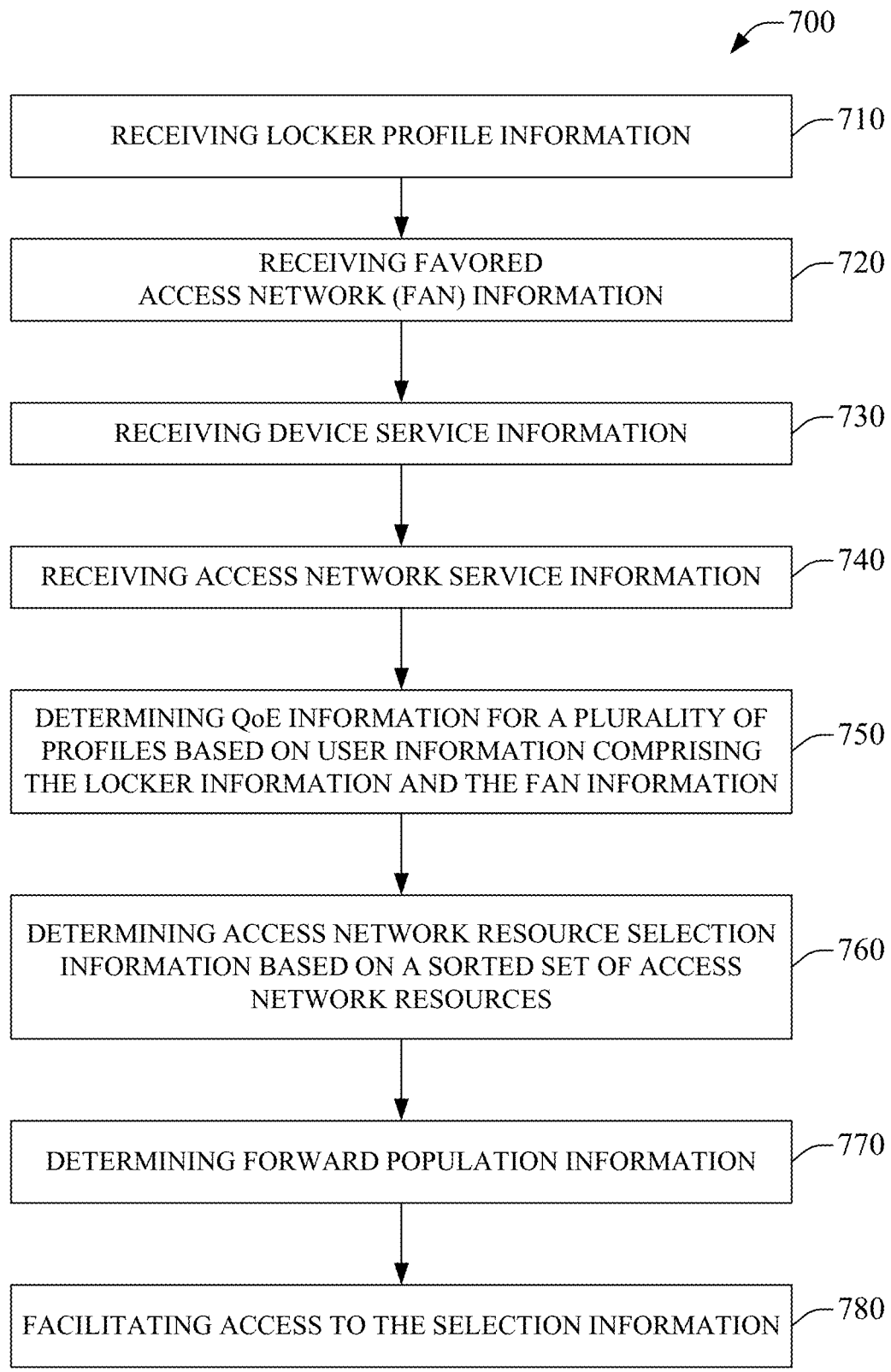
FIG. 7 depicts a method facilitating access to selection information via an ANDSF component based on ranking and group quality of experience (QoE) information in accordance with aspects of the subject disclosure.

FIG. 7 illustrates a method 700 that facilitates access to selection information via an ANDSF component based on ranking and group QoE information in accordance with aspects of the subject disclosure. At 710, method 700 can include receiving locker profile information. Locker profile can comprise an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. The locker profile information can be employed to improve ANDSF information selection, for example, ANDSF information employing locker profile information can be based on a predicted location, a favored resource, and an anticipated user behavior determined from a behavior model, to allow pre-authentication of a UE with a ranked access network resource in the predicted location allowing the UE to transition to the new resource seamlessly. Moreover, the ranking of the ranked ANR in the instant example can be based on the anticipated behavior to allow selection or provisioning of resources by, for example, a network provider, in an efficient manner. In some embodiments, locker profile information can comprise a user behavior model as disclosed elsewhere herein.

At 720, method 700 can include receiving favored access network (FAN) information. FAN information can be related to a plurality of favored ANRs. These ANRs can be ordered or ranked. In an aspect, a user can designate favored ANRs to facilitate the ranking or ordering. In another aspect, the ranking or ordering can be determined from historical linking of a UE to an ANR. In a further aspect, ranking or ordering of the ANRs can be affected by additional information related to use of an ANR or related to information about an ANR. As an example, a first ANR can be associated with free unlimited streaming of music via a branded mobile application, wherein the first ANR can be designated as a FAN ANR and can receive a higher ranking when a UE is executing the branded mobile application.

At 730, method 700 can comprise receiving device service information. Device service information can comprise information related to providing service to a device, such as, information related to a wireless service provider or service provided thereby, account information related to an a UE, etc. Device service information can be determined based on an analysis of historical service information, QoE information, etc. Device service information can further comprise ANDSF rules or updates to ANDSF rules for selection of an ANR. As an example, device service information can comprise ANDSF information, such as network congestion information, available ANR information, encryption information, an updated ANR selection rule, etc., related to a service area of an edge device comprising edge ANDSF component.

At 740, method 700 can include receiving access network service information. Access network service information can comprise information related to ANR services and performance. In an aspect, ANR services and performance information can comprise current or historical availability of an ANR, coverage areas of an ANR, QoS of an ANR, performance characteristics of an ANR, costs or fees associated with use of an ANR, service agreements with an ANR, etc. This information can affect determination of selection information by an edge ANDSF component. As an example, where an ANR has poor performance characteristics but is historically available, serves a location associated with a UE, and has a no cost agreement with a wireless carrier, this information can affect a position of the ANR in a ranking of ANRs performed by an edge ANDSF component, which in turn can affect inclusion of this ANR in selection information.

At 750, method 700 can comprise determining QoE information related to a plurality of profiles based on user information comprising the locker profile information and the FAN information. Changes to QoE can be inferred based on selection information for a plurality of UEs. This inference can be employed to adapt sorting to meet a determined objective, e.g., maintaining a determined level of QoE, etc. In an aspect, where multiple UEs interact with an edge device comprising an edge ANDSF component, the QoE experienced by each UE can be based on how resources are allocated, permutations of which UEs are offloaded to an available ANRs, historical use, etc. As an example, offloading a UE to a first available ANR may cause the QoE metric to be less desirable than offloading a UE to an ANR based on the application environment of the UE and available resources of the ANR. In this example, where a UE is executing VoIP, it can be desirable to have low packet loss in an ANR, it can be inefficient to suggest, by way of selection information, that the UE link with a first available ANR and ignore historical packet loss information for that ANR. In contrast, selecting an ANR with low packet loss for the UE is preferable even where it is not the first available ANR. This analysis can impact an overall QoE scores. At 750, QoE information can be determined for variations in ANR recommendations comprised in selection information. This can allow selection information to comprise recommendations of ANRs that can meet QoE goals for multiple UEs. In an aspect, 750 can represent an optimization process related to selecting a combination of ANRs for a set of UEs that meets a QoE goal for the set and/or the individual pairings of ANR and UE.

At 760, method 700 can include determining access network selection information. The determination of the access network selection information can be based on a sorted set of ANRs. An ANR can be ordered or sorted against other ANRs to facilitate selection of the ANR for linking with a UE in a preferential order or based on a sort criterion. Sorting or ordering can be based on a sorting rule or ordering rule, an updated to the rule, cellular network congestion, known ANRs, available ANRs, a historical ANR service area, billing agreements for ANRs of other providers, carrier-centric selection rules, ANDSF information from core network components, an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc., which information can be included in locker profile information from 710, FAN information from 720, device service information form 730, or access network service information form 740.

At 770, method 700 can include determining forward population information. An edge ANDSF component can, in an aspect, comprise ANDSF information for local UEs or anticipated UEs, and sharing of ANDSF information with other edge ANDSF components can be effective to reduce holes in ANDSF coverage for a UE in a wireless network employing edge ANDSF components. In an aspect, nearby edge ANDSF components can share ANDSF information such that edge devices comprising an edge ANDSF component have relevant information to enable ANDSF information for a UE. This can allow a UE to move in any direction with a level of confidence that the next edge device will have an edge ANDSF component with ANDSF information for the UE. In another aspect, determining probable edge device transitions for the UE can facilitate selectively forwarding ANDSF information. As an example, where a UE is associated with a specific zone, it can be unnecessary to forward ANDSF information to all edge devices that are near the zone but not in the zone. In the example, it can be more efficient to transfer ANDSF information specifically to edge devices that are only in the zone where an inference can be made that the UE will not leave the zone based on historical information. Determining forward population information can be related to simple forward population of ANDSF information determined to satisfy a rule related to a propagation depth, or can be related to more advanced forward population of ANDSF information that employs predictive analysis for determining which edge ANDSF components to populate.

At 780, method 700 can comprise facilitating access to the selection information determined at 760. At this point method 700 can end. Selection information can comprise information facilitating the selection of a preferred ANR to link with a UE. Selection information can further comprise ANR identification information, ANR ranking information, ANR characteristic values, such as speeds, handshake information, bandwidth limits, etc., encryption keys, passwords, etc. Where a plurality of ANRs are included in the selection information, they can be ranked, ordered, or sorted.

In an aspect, method 700 can be performed at a network edge device. A network edge device can be a device located at a logical edge of a wireless network associated with a wireless service provider, e.g., a device located at an edge of a radio access network (RAN), such as, a NodeB, a femtocell, a picocell, or other logical edge device. In an aspect, determination of the access network selection information at an edge device can be related to determination of the access network selection information based on local access network resources (ANRs) and local UEs. In comparison to employing conventional core network ANDSF components, determining access network selection information based on local ANRs and local UEs can process less data and thereby beneficially allow for use of alternative processors, memories, cabling, etc., that can be lower cost, older and more well understood, more readily available, easier to implement, etc.

Figure 8:
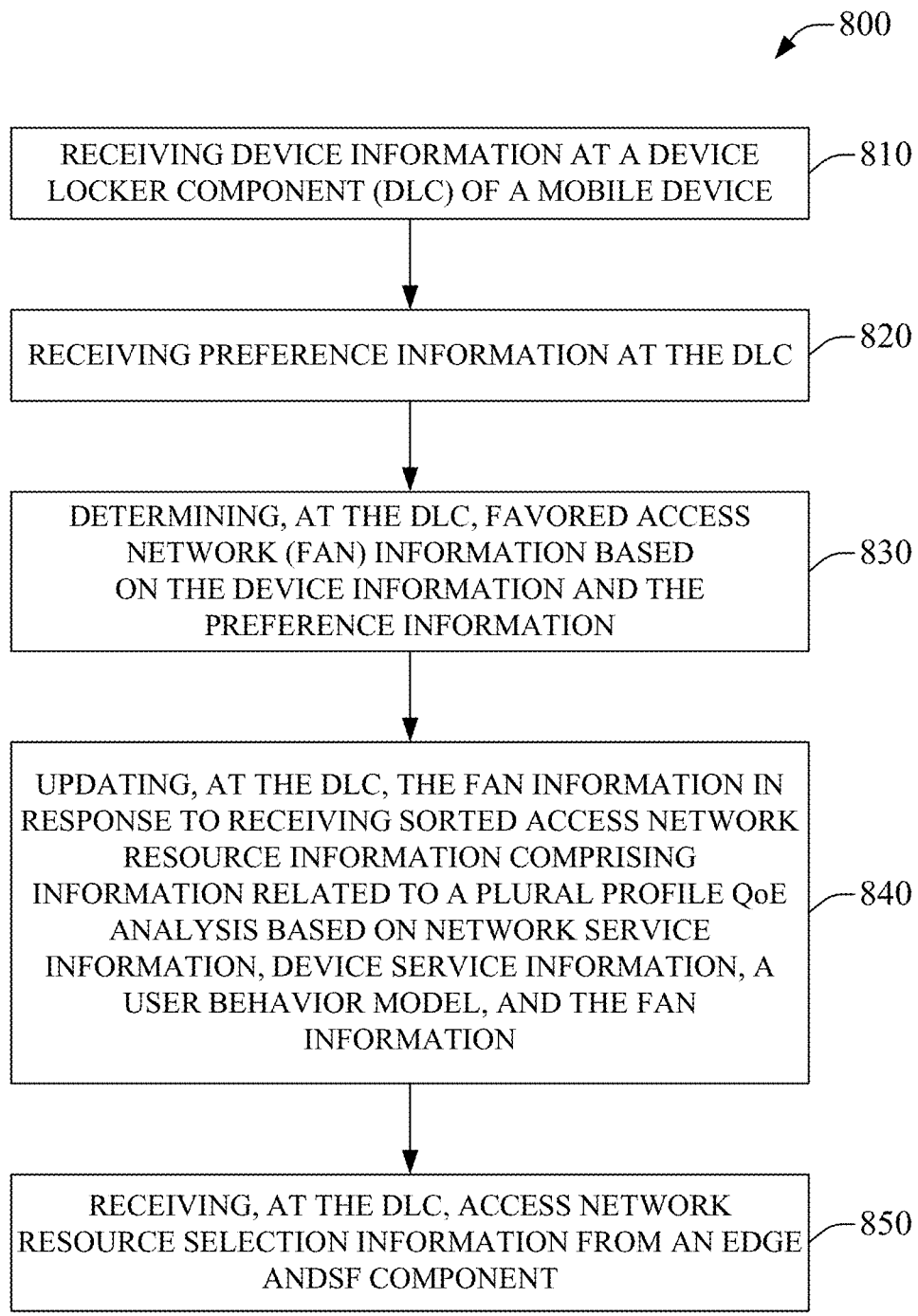
FIG. 8 illustrates a method facilitating receiving selection information at a device locker component and updating favored access network information in accordance with aspects of the subject disclosure.

FIG. 8 illustrates a method 800 that facilitates receiving selection information at a device locker component and updating favored access network information in accordance with aspects of the subject disclosure. At 810, method 800 can include receiving device information at a device locker component (DLC) of a mobile device. Device information from a DLC can include a user behavior model associated with a user of UE, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc.

At 820, method 800 can comprise receiving preference information at the DLC. Preference information can comprise information related to user preferences. User preferences can be related to ANRs. In some embodiments, user preference information can be related to a preferred use of a UE which can correspond to determining an appropriate ANR, for example, where a user preference indicates a floor data rate in relation to applications executing on the UE, this preference can be related to selecting an ANR determined to satisfy a rule relating to the floor data rate.

At 830, method 800 can comprise determine, at the DLC, favored access network (FAN) information. This can be based on the device information from 810 and the preference information from 820. FAN information can be related to a plurality of favored ANRs. These ANRs can be ordered or ranked. In an aspect, a user can designate favored ANRs to facilitate the ranking or ordering. In another aspect, the ranking or ordering can be determined from historical linking of a UE to an ANR. In a further aspect, ranking or ordering of the ANRs can be affected by additional information related to use of an ANR or related to information about an ANR.

At 840, method 800 can include updating, at the DLC, the FAN information in response to receiving sorted, ranked, or ordered ANR information comprising information related to a plural profile QoE analysis based on network service information, device service information, and the FAN information from 830. determining, ranking information related to an ANR. An ANR can be sorted, ordered, or ranked against other ANRs to facilitate selection of the ANR for linking with a UE in a preferential order. Ranking or ordering can be based on a ranking rule or update thereto, cellular network congestion, known ANRs, available ANRs, a historical ANR service area, billing agreements for ANRs of other providers, carrier-centric selection rules, ANDSF information from core network components, an identifier, location information, motion information, time information, predicted location information, schedule information, an encryption key, financial information, billing information, information related to a process in execution on the UE, quality of experience (QoE) or quality of service (QoS) information, service tier information, user preferences, security information, privacy information, device hardware information, device software information, a behavior model, access network resource information, etc. The FAN information can be updated based on this information. Whereas the FAN information is affiliated with the DLC of a UE, this information can be considered portable and can be accessed from the DLC at new edge ANDSF components to facilitate importing advanced ANDSF functionality at the new edge ANDSF components.

At 850, method 800 can comprise receiving, at the DLC, ANR selection information from an edge ANDSF component. At this point, method 800 can end. The ANR selection information can be based on the ranking information, which can be based on device information, preference information, historical service information, or QoE information analyzed at an edge ANDSF component.

Figure 9:
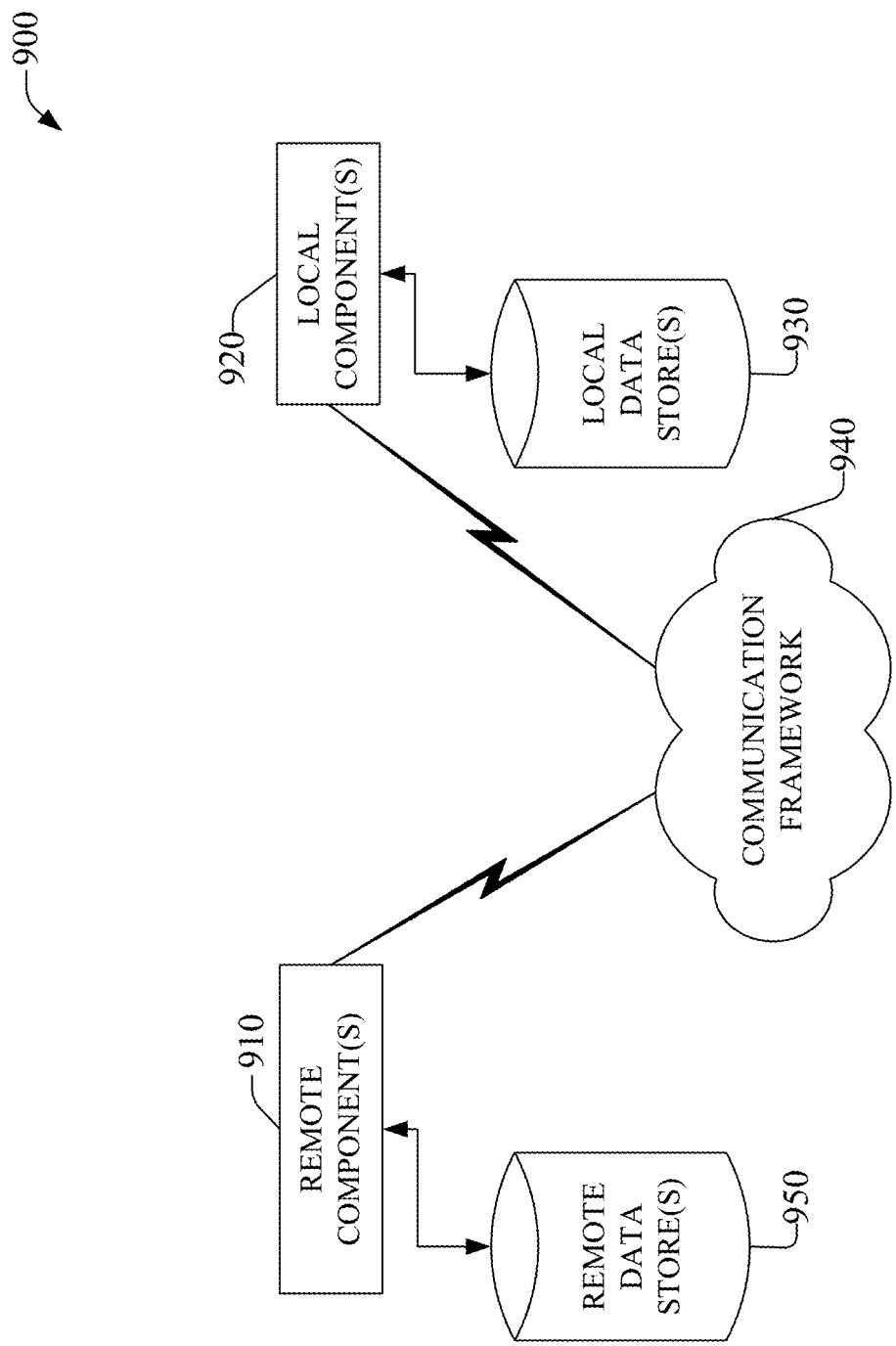
FIG. 9 depicts a schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be a DLC 220-420, UE device 430, etc.

The system 900 also includes one or more local component(s) 920. The local component(s) 920 can be hardware and/or software (e.g., threads, processes, computing devices). In some embodiments, local component(s) 920 can include, for example, an edge ANDSF component 110-410, 412, 414, an edge device 440, 442, 444, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
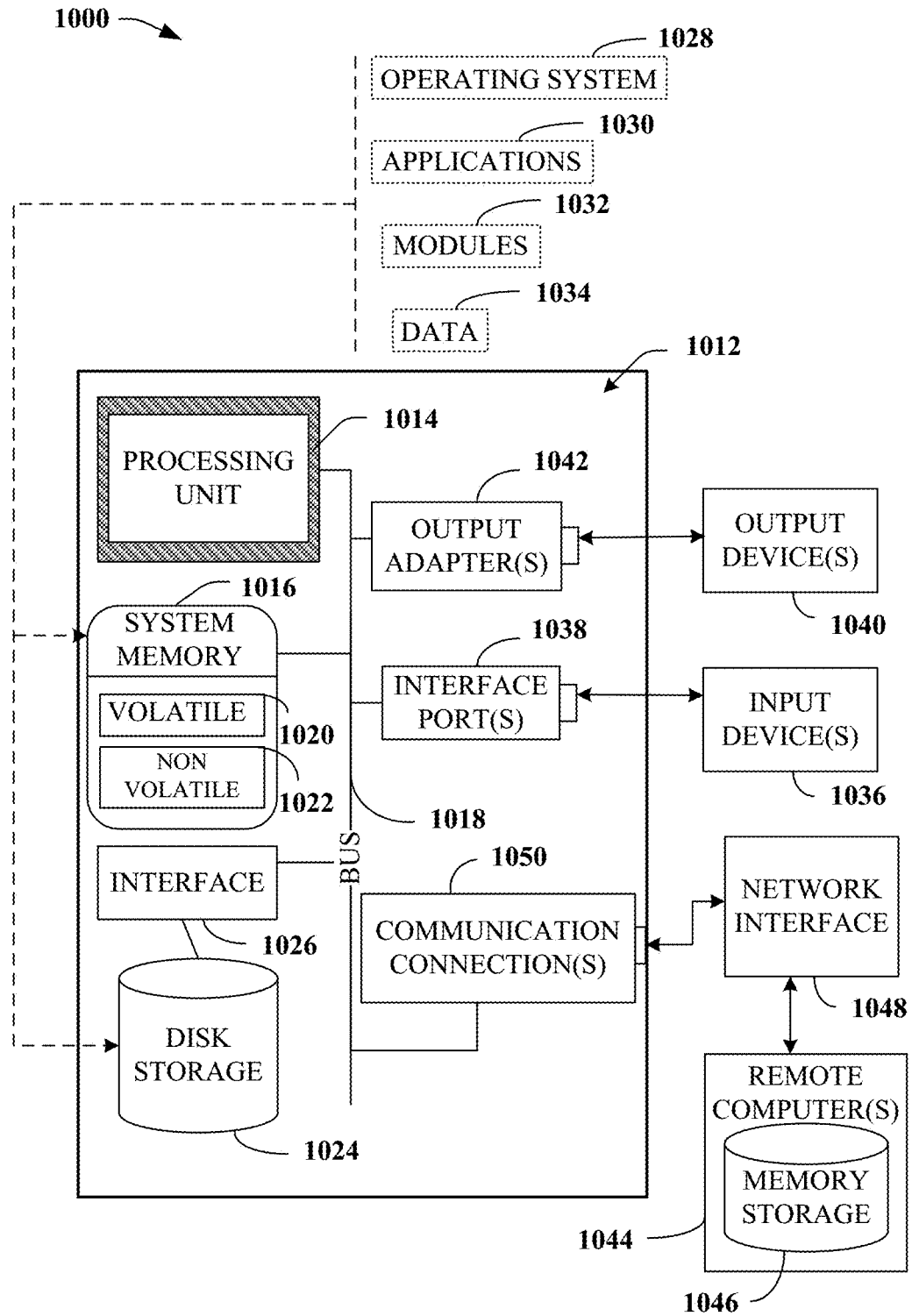
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of S DLC 220-420, UE device 430, edge ANDSF component 110-410, 412, 414, edge device 440, 442, 444, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information 224, etc., and can be embodied in a touch sensitive display panel, a mouse input GUI, a command line controlled interface, etc., allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/ software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        updating user profile data of a user profile based on an aggregate usage of devices associated with the user profile, wherein a credential of the user profile relates to enabling a connection to an access point device facilitating use of a wireless network by a device of the devices;
        ranking a resource that is available via the access point device based on a rule related to the resource; and
        in response to the device being determined to be in a service area of the access point device, providing access to the credential based on the ranking, wherein the credential facilitates access to the resource by the device via the access point device.

2. The system of claim 1, wherein the rule relates to a service level of the access point device that corresponds to a service level identifier comprised in the user profile data.

3. The system of claim 1, wherein the access point device is a cellular base station device.

4. The system of claim 1, wherein the access point device is a Wi-Fi base station device.

5. The system of claim 1, wherein the access point device is a femtocell device.

6. The system of claim 1, wherein an edge device of the wireless network comprises the memory and the processor.

7. The system of claim 6, wherein the edge device is selected from a group of devices comprising a NodeB device, an eNodeB device, a femtocell device, and a picocell device.

8. The system of claim 1, wherein the device is a mobile communication device.

9. The system of claim 8, wherein the mobile communication device is a mobile phone.

10. A method, comprising:
in response to receiving, by a device comprising a processor, information relating to an aggregate use of devices associated with a user profile, updating user profile data corresponding to the user profile comprising a credential that facilitates connection to an access point device enabling access to a network;
sorting, by the device, access point devices comprising the access point device based on an availability of a resource via the access point device; and
in response to a mobile device of the devices being determined to be in a service area of the access point device, enabling, by the device, access to the credential to facilitate access to the resource by the mobile device via the access point device.

11. The method of claim 10, wherein the sorting is further based on a service level of the access point device.

12. The method of claim 10, wherein the access point device is a femtocell base station device.

13. The method of claim 10, wherein the access point device is a Wi-Fi base station device.

14. The method of claim 10, wherein the access point device is a cellular base station device.

15. The method of claim 10, wherein user profile data is stored at an edge device of the network.

16. The method of claim 15, wherein the edge device is selected from at least one of a NodeB device, an eNodeB device, a femtocell device, or a picocell device.

17. A non-transitory machine-readable medium, comprising executable instructions that, when executed by a processor of an edge device of a network, facilitate performance of operations, comprising:
in response to receiving information relating to a use of devices associated with a user profile, updating user profile data of the user profile based on an aggregate use of the devices, wherein the user profile data comprises a credential associated with accessing an access point device in accord with an access network discovery and selection function rule for a network; and
in response to determining that a mobile device of the devices is in a service area of the access point device, providing access to the credential, to facilitate access by the mobile device to a resource via the access point device, in response to determining a degree to which the resource satisfies a resource request.

18. The non-transitory machine-readable medium of claim 17, wherein the access point device is selected from a group comprising a Wi-Fi base station device, a cellular base station device, and a non-macro cell base station device.

19. The non-transitory machine-readable medium of claim 17, wherein the edge device of the network is selected from at least one of a NodeB device or an eNodeB device.

20. The non-transitory machine-readable medium of claim 17, wherein the edge device is selected from a group comprising a non-macro cell device.

* * * * *